(12) United States Patent
Frumkin et al.

(10) Patent No.: US 11,127,167 B2
(45) Date of Patent: Sep. 21, 2021

(54) EFFICIENT MATRIX FORMAT SUITABLE FOR NEURAL NETWORKS

(71) Applicant: NVIDIA Corporation, Santa Clara, CA (US)

(72) Inventors: Michael Frumkin, Los Altos, CA (US); Jeffrey Pool, Durham, NC (US); Jorge Albericio Latorre, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 94 days.

(21) Appl. No.: 16/397,034

(22) Filed: Apr. 29, 2019

(65) Prior Publication Data
US 2020/0342632 A1    Oct. 29, 2020

(51) Int. Cl.
*G06K 9/36* (2006.01)
*G06T 9/00* (2006.01)
*G06K 9/46* (2006.01)

(52) U.S. Cl.
CPC .................. *G06T 9/002* (2013.01)

(58) Field of Classification Search
CPC . G06T 9/002; G06F 17/16; G06F 2207/4824; G06F 9/3016
See application file for complete search history.

(56) References Cited

U.S. PATENT DOCUMENTS

| | | | | |
|---|---|---|---|---|
| 7,439,883 | B1* | 10/2008 | Moni ..................... | H04N 19/61 341/60 |
| 2008/0126467 | A1* | 5/2008 | Ghuloum ............... | G06F 17/16 708/520 |
| 2014/0108481 | A1* | 4/2014 | Davis ..................... | G06F 17/16 708/607 |
| 2014/0188969 | A1* | 7/2014 | Chotai ................... | G06F 17/16 708/520 |
| 2014/0298351 | A1* | 10/2014 | Usui ...................... | G06F 17/16 718/107 |
| 2015/0324125 | A1* | 11/2015 | Li .......................... | G06F 3/0679 711/103 |
| 2017/0293659 | A1* | 10/2017 | Huang ................... | H03M 7/30 |
| 2018/0157708 | A1* | 6/2018 | Natvig ................. | G06F 16/2255 |
| 2018/0189675 | A1* | 7/2018 | Nurvitadhi ........... | G06F 16/285 |

(Continued)

OTHER PUBLICATIONS

Bell, Nathan, et al., "Efficient Sparse Matrix-Vector Multiplication on CUDA," NVIDIA Technical Report NVR-2008-24, Dec. 2008, 32 pages.

(Continued)

*Primary Examiner* — Amara Abdi
(74) *Attorney, Agent, or Firm* — Nixon & Vanderhye, P.C.

(57) ABSTRACT

Many computing systems process data organized in a matrix format. For example, artificial neural networks perform numerous computations on data organized into matrices using conventional matrix arithmetic operations. One such operation is the transpose operation. Techniques are introduced for storing a matrix in a compressed format that allows, for example, a transpose operation to be performed during decompression. Thus, by utilizing the introduced techniques, transformations of compressed matrices such transposition can be achieved in a more effective way. Parallel processing may also be used to more efficiently compress and/or decompress.

20 Claims, 24 Drawing Sheets

(56) References Cited

U.S. PATENT DOCUMENTS

2019/0188239 A1* 6/2019 Serrano ............... G06F 9/38
2019/0266217 A1* 8/2019 Arakawa ............ G06F 9/30036

OTHER PUBLICATIONS

Brownlee, Jason, "A Gentle Introduction to Sparse Matrices for Machine Learning," Linear Algebra, Mar. 14, 2018, 20 pages.

Zhao, Yue, et al., "Bridging the Gap between Deep Leaarning and Sparse Matrix Format Selection," PPoPP '18, Feb. 24-28, 2018, Vienna, Austria, Association for Computing Machinery, 2018, 15 pages.

"Sparse BLAS Diagonal Matrix Storage Format," Intel® Math Kernel Library, Developer Reference for Intel® Math Kernel Library—C, <software.intel.com/en-us/mkl-developer-reference-c-sparse-blas-diagonal-matrix-storage-format> submitted Mar. 6, 2019, 3 pages.

"Sparse Linear Algebra," cuSPARSE Library of CUDA, NVIDIA Corporation, 2019, 4 pages.

* cited by examiner

|   | A | B |   |
|---|---|---|---|
| C |   |   | D |
|   | E | F |   |
| G |   |   | H | nnz_mask of created sparce matrix

| 0 | 1 | 1 | 0 |  → 0x6
| 1 | 0 | 0 | 1 |  → 0x9    → 0x6969
| 0 | 1 | 1 | 0 |  → 0x6
| 1 | 0 | 0 | 1 |  → 0x9 nnz_mask after cyclic shift

| 0 | 1 | 1 | 0 |  → 0x6
| 0 | 0 | 1 | 1 |  → 0xC    → 0x6C93
| 1 | 0 | 0 | 1 |  → 0x9
| 1 | 1 | 0 | 0 |  → 0x3

Fig. 12C

EFFICIENT MATRIX FORMAT SUITABLE FOR NEURAL NETWORKS

FIELD

This technology relates to compression and decompression of data sets for compact storage and/or communication, and more particularly to compression of sparse matrix data for subsequent decompression in transposed and/or non-transposed forms. This technology also relates to compression and decompression of sparse matrix data for use for example in deep learning, machine learning and artificial intelligence systems. This technology also relates to graphics processing units (GPUs) generating, storing and/or using compressed and decompressed sparse matrix data in deep neural networks (DNNs).

BACKGROUND

Massively parallel processing systems, such as GPUs (graphical processing units), include many high performance processing units that can simultaneously perform arithmetic operations in parallel. The large number of parallel processing units make them well suited for parallel processing of large data sets. Even with these systems that can speed up processing of large data sets using parallel processing, a big cost in performing computations with large data sets is memory latency and bandwidth.

Data compression can be used to reduce memory and transmission latency. A data compressor reduces the size of the data for storage and/or communication. A data decompressor can be used to recover the data for further processing and other uses. Data compression can be lossy or lossless. Lossy encoding methods use inexact approximations and/or get rid of unwanted or unneeded data. MP3 audio, H.265 video and JPEG images are examples of lossy encoding. Such compression techniques eliminate more detailed information that doesn't make much difference to human perception (e.g., think of an "abridged" edition of a much longer story) so the data can be stored in reduced memory space and transmitted faster at reduced bandwidth. In contrast, lossless encoding methods compress the data into a format from which all original data can be recovered without information loss. Lossless ("unabridged") encoding is often used in applications where data represents text or mathematical properties and every detail makes a difference. Lossless compression can use a variety of different techniques for representing the same amount of data in a smaller space.

One type of commonly used large data set that can benefit from lossless compression is the so-called "sparse matrix". Sparse matrices are widely used in many applications such as machine learning, artificial intelligence and deep neural networks. Basically, a matrix is "sparse" when it contains lots of zero values (e.g., many more zero values than non-zero values). Because sparse matrices contain relatively few non-zero values, sparse matrices are a natural candidate for data compression.

To efficiently store and process a sparse matrix, compressed data structures (storage formats) can be used which store only the nonzero entries. Various compressed storage formats have been proposed:

Coordinate (COO) format explicitly stores the row and column indices and the values of all nonzero entries in rows, columns, and data arrays separately.

Compressed sparse row (CSR) format retains the same columns and data arrays of COO but compresses the row indices into pointer elements of which are the beginning positions of all rows in the columns/data.

The Diagonal (DIA) format stores non-zeros along the diagonal direction (from top left to bottom right). Array offsets record the offsets of each diagonal from the principal diagonal.

See e.g., Zhao et al, "Bridging the Gap between Deep Learning and Sparse Matrix Format Selection", PPoPP '18, Feb. 24-28, 2018, Vienna, Austria (ACM 2018); "Sparse BLAS Diagonal Matrix Storage Format" in Intel® Math Kernel Library<software.intel.com/en-us/mkl-developer-reference-c-sparse-blas-diagonal-matrix-storage-format>.

With many compression/decompression techniques, there is a tradeoff between compactness and time. Just as it takes longer to carefully pack a travel bag to fit as much as possible, it may take longer to compress a sparse matrix data file to achieve maximum compression. But unlike the travel bag analogy, it may take much longer to unpack a highly compressed sparse matrix data file as compared with one that is not as compressed. With increases in data sizes and analytical demands, solutions are needed for efficient on demand data decompression. For example, solutions are needed in which compressed data is provided in formats that can efficiently yield decompressed data in several different versions e.g., depending on how the data is going to be used.

SUMMARY

Example embodiments provide lossless data compressors and decompressors ("codecs") for matrix data. Example embodiments provide systems and methods for generating, storing, and/or performing operations using matrix data compressed using a diagonal storage format. The diagonal storage format allows for the original matrix, transposed matrix, compacted original matrix, and/or compacted transposed matrix to be easily generated from the diagonal storage format. An example embodiment of the diagonal storage format includes an array of nonzero elements along each diagonal of a matrix in turn and indices of nonzero elements. The indices of nonzero elements may be provided in a map such as a bitmap indicating location of nonzero elements. In some example embodiments, rows of the map may be cyclically shifted, and the indices of nonzero elements may be determined from the cyclically shifted bitmap.

Example embodiments provide, processing system (e.g., GPU) configured to execute a load from memory instruction for retrieving matrix data stored in a diagonal storage format from a shared memory, decompressing the data into another format. For example, a memory load instruction may include converting matrix data stored in a diagonal storage format into a dense or dense transposed matrix, and writing the dense or dense transposed matrix and metadata in registers.

According to an embodiment, data decompressor is provided. The decompressor comprises an input circuit configured to receive a compressed data file comprising (a) a stream of non-zero values along sparse matrix diagonals and (b) a mask indicating sparse matrix locations of the non-zero values, and a decoder configured to use the mask to populate a transposed dense matrix with the non-zero values in the stream.

According to some example embodiments, the decoder may be configured to populate the transposed dense matrix without storing intermediate matrix data.

According to another embodiment, a processing system configured to execute load matrix instructions stored in memory is provided. The instructions may retrieve compressed data comprising (a) a stream of non-zero values along matrix diagonals and (b) a mask indicating matrix locations of the non-zero values in the stream, and generate, based on the stream of non-zero values and mask, a dense matrix and metadata. In some embodiments, the generated dense matrix is a transposed matrix of a matrix represented by the stream of non-zero values and metadata, the generated dense matrix is stored in registers, and/or a matrix represented by the stream of non-zero values and the mask includes data with sparsity greater than 0.5.

According to another embodiment, a method performed by at least one programmable multi-threaded processor is provided. The method comprises receiving, from memory, compressed matrix data comprising an array of consecutive non-zero values along diagonals of a matrix and a mask indicating locations of non-zero values; generating a dense matrix and/or a dense transposed matrix based on the array of consecutive non-zero values and the mask; and storing the generated matrix or transposed matrix in the memory.

According to another embodiment, a method performed by a least one processor executing instructions stored in memory is provided. The method comprises: receiving, from memory, compressed matrix data including (a) a stream of non-zero values along matrix diagonals and (b) index data indicating matrix locations of the non-zero values in the stream; and executing a plurality of threads to determine, based on the index data, matrix and/or transposed matrix coordinates of the non-zero values, wherein each thread determines coordinates of a different non-zero value.

BRIEF DESCRIPTION OF THE DRAWINGS

The following detailed description of exemplary non-limiting illustrative embodiments is to be read in conjunction with the drawings of which:

FIG. 3A shows a matrix and a transposed matrix.

FIGS. 3B and 3C show corresponding diagonals of a matrix and a transposed matrix.

FIGS. 12A-12C illustrate matrix representation by diagonals for a matrix having 4 elements and 2 nonzero values per row.

DETAILED DESCRIPTION OF EXAMPLE NON-LIMITING EMBODIMENTS

Example non-limiting technology herein provides data compressors and decompressors which compress and decompress matrix data in a format storing non-zero values in a diagonal ordering. This compression format allows for lossless compression. Decompressors can use the compressed data to efficiently generate different versions of data. For example, one embodiment decompressor can selectively recover an original sparse matrix or instead produce a transposed version of the sparse matrix. Example non-limiting technology herein thus provide data decompressors which can decompress the data to recover the original data, generate the original data in a different compressed format, and/or provide modified version of the original data. The different compressed format may be a format that makes it efficient for a processing system to perform computations on. The modified version of original data may include the original data being provided in different order. As an example, the modified representation may comprise a transposed matrix which reorders rows of the original matrix into columns of the transposed matrix.

Example non-limiting technology herein also provides compressed data in a format from which a decompressor can extract information for performing operations without needing to reconstruct the original data represented by the compressed data. As an example, for certain operations, the decompressor can selectively recover indices, or nonzero values and indices of an original sparse matrix and/or a transposed version of the sparse matrix without generating the original and/or the transposed matrix.

Example non-limiting technology herein also provides processing system (e.g., GPU) configured to execute a load from memory instruction which can decompress compressed data into a format needed for an operation requesting data. As an example, for certain operations, the load from memory instruction may retrieve compressed matrix data, convert the data into one or more different formats (e.g., compressed format, decompressed formats, and/or format with rearranged data), and store the converted data in registers.

Figure 1A:
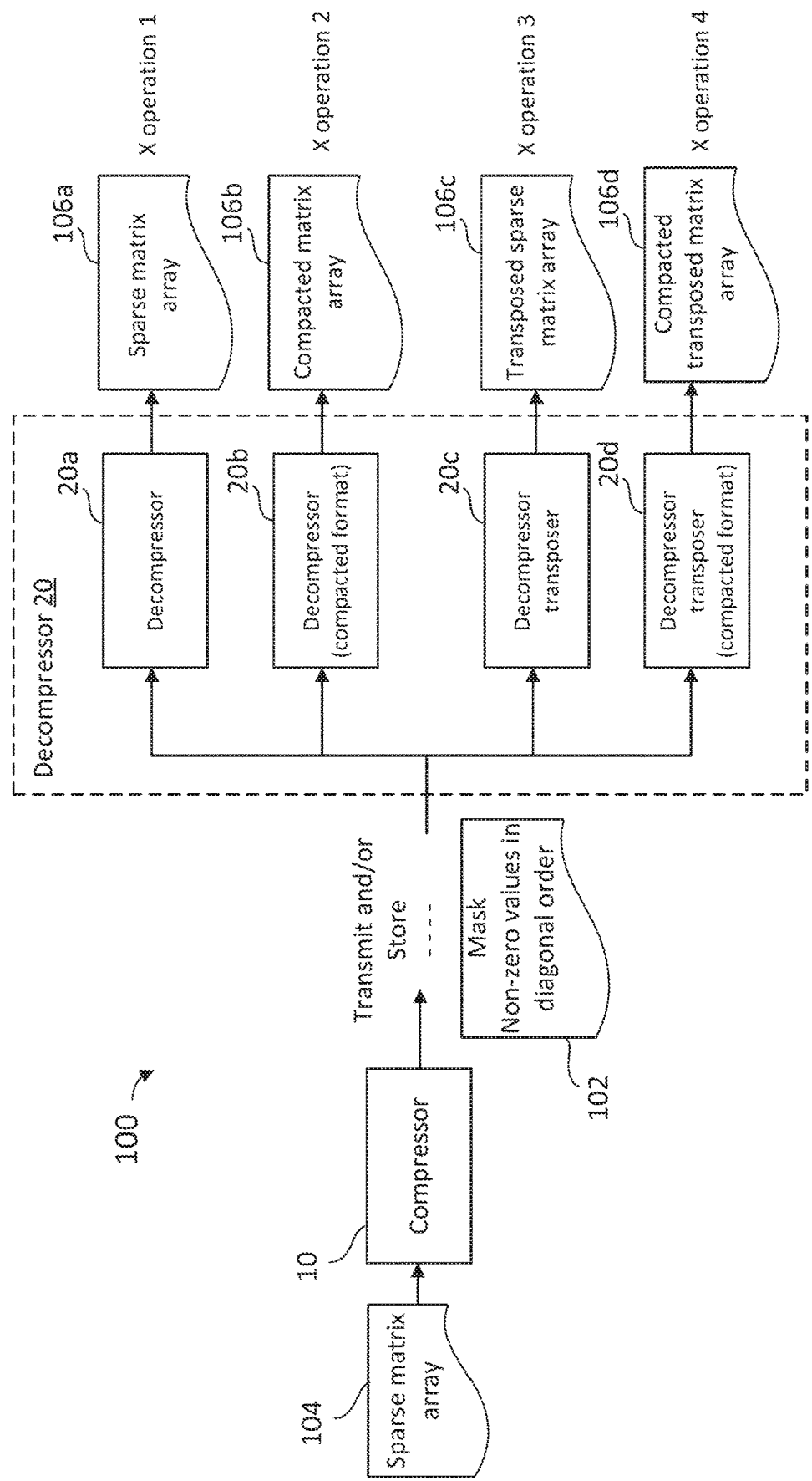
FIG. 1A shows an example non-limiting data compression and decompression.

FIG. 1A shows an example non-limiting data compression and decompression or "codec" system 100. The codec system 100 may comprise a compressor 10 and a plural of different decompressors 20 (which could all be provided within the same "codec" 100 or decompressor 20). The compressor 10 may be configured to compress sparse matrix array into a compressed data file 102. Decompressors 20a-20d may be configured to generate different data sets of decompressed data from the same compressed data file 102.

The compressor 10 receives a sparse matrix array 104 and generates a compressed data file 102 in a diagonal storage format. The diagonal storage format in one example embodiment includes a mask and a stream of non-zero values in diagonal order. The mask provides data for determining location of non-zero values in the decompressed data (e.g., original sparse matrix array or a transposed sparse matrix array). In one example, the mask may be a bitmask with ones (or zeros) indicating location of non-zero values in the sparse matrix array.

The mask and the non-zero values in diagonal order can be stored in memory for retrieval by and/or transmitted to the decompressors 20a-20d.

The decompressors 20a-20d may be configured to decompress the compressed data and generate data sets 106 corresponding to the sparse matrix array 104. In some example embodiments, operations (e.g., linear algebra operations) may be performed using the generated data sets 106. In some example embodiments, operations (e.g., linear algebra operations) may be performed using information extracted from the compressed data (e.g., non-zero values and/or matrix indices of the non-zero values), without reconstructing the sparse matrix array 104.

As shown in FIG. 1A, the decompressor 20a receives the compressed data file 102 including the mask and non-zero values and generates a sparse matrix array 106a that is the same as (or substantially identical to) the sparse matrix array 104 provided to the compressor 10. The decompressor 20b uses this same compressed data file 102 to generate a compacted matrix array 106b which corresponds to the sparse matrix array 104 provided to the compressor 10 but represented in a "compacted" form. The decompressor 20c uses this same compressed data file 102 to derive a transposed sparse matrix array 106c which corresponds to a transposed version of the sparse matrix array 104 provided to the compressor 10. The decompressor 20d uses this same compressed data file 102 to derive a compacted transposed matrix array 106d which corresponds to the transposed version of the sparse matrix array provided to the compressor 10.

In some example embodiments, the "compacted" versions 106b, 106d of the matrix arrays provide the data in a format that is different from the diagonal storage format but which is still smaller than the original sparse matrix array 104. The compacted format may for example be a format in which computations can be performed using the data without fully decompressing the data. In one example, the compacted version provides a "dense matrix array" (most of the elements are nonzero) which corresponds to the sparse matrix array. The dense matrix array may include non-zero and zero values and/or store the values in row or column order.

In some example embodiments, the decompressor 20 may be configured to decompress the compressed data and generate data sets in dense, coordinate, compressed sparse row, compressed sparse column, Ellpack-Itpack Format (ELL), a hybrid storage formats, and/or another format. The dense matrix format may be stored in column-major format in memory and may be represented by a number of rows, a number of columns, and points to the data array containing the matrix elements. The coordinate matrix format (COO) may be represented by a number of nonzero elements in the matrix, points to the data array holding the nonzero values in row-major format, points to the integer array that contains the row indices of nonzero values, and points to the integer array containing the column indices of the nonzero values. The compressed sparse row format (CSR) may be represented by a number of nonzero elements in the matrix, points to the data array of nonzero values, points to the integer array that contains a compressed row indices of nonzero values, and points to the integer array containing the column indices of the nonzero values. The compressed sparse column format (CSC) may be represented by a number of nonzero elements in the matrix, points to the data array of nonzero values, points to the integer array that contains a row indices of nonzero values, and points to the integer array containing compressed column indices of the nonzero values. The Ellpack-Itpack Format (ELL) may represent an m×n sparse matrix A with at most k nonzero elements per row stored using two dense arrays of dimension m×k, with the first array containing the values of the nonzero elements in the matrix and the second array containing the corresponding column indices. Other formats may include Block Compressed Sparse Row Format (BSR) or Extended BSR Format (BSRX).

An advantage of system 100 using the diagonal storage format 104 is that it becomes equally efficient to reconstruct the original sparse matrix array 106a and the transposed version 106c of the sparse matrix array because transposition operation maps a diagonal of the original matrix array to a diagonal of the transposed matrix array. The diagonal storage needs only one copy of non-zeroes and of mask, from which different versions of original and transposed matrix array can be derived and/or reconstructed.

In some embodiments, the decompressor may generate the compacted sparse matrix array 106b, a transposed sparse matrix array 106c, and/or a compacted transposed matrix array 106d without generating intermediate results, which may include the original matrix array.

Example Non-Limiting Processing System

Figure 1B:
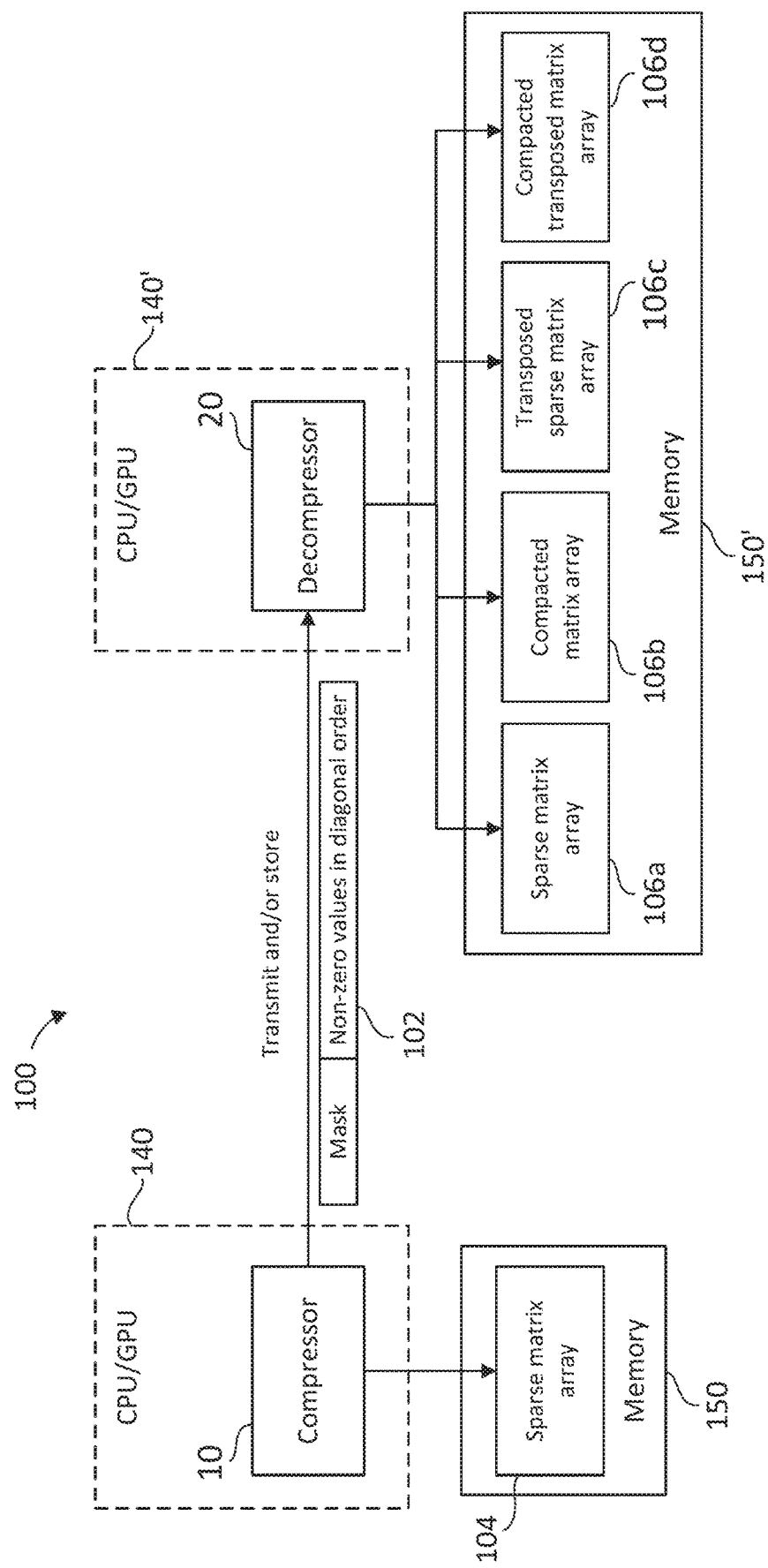
FIG. 1B shows a block diagram of an example processing system including a compressor and a decompressor for compressing and/or decompressing sparse matrix array according to various embodiments disclosed in this specification.

FIG. 1B shows a block diagram of an example processing system 100 including a processor-implemented compressor 10 and a processor-implemented decompressor 20 for compressing and/or decompressing sparse matrix arrays. The compressor 10 and/or decompressor 20 may be provided in the form of a CPU and/or GPU that executes instructions stored in non-transitory memory. In some other examples, the compressor 10 and/or decompressor 20 may be provided in hardware as part of a memory controller such as a cache controller operatively coupled between a cache memory and a CPU and/or GPU.

A memory 150 may store sparse matrix array 104. The compressor 10 may be configured to access the sparse matrix array data 104 from the memory 150 and compress the sparse matrix array data into a compressed, diagonal storage format 102 including for example a mask and non-zero values in diagonal order.

The compressed data 102 may be stored in memory and/or transmitted to a system capable of decompressing the compressed data to recover useful information from it.

For example, a decompressor 20 (which may be in the same or different location as the compressor 10 and may comprise the same or different CPU, GPU and/or hardware as used to implement the compressor) receives compressed data 102 (e.g., the mask and non-zero values in diagonal order) and decompresses the data. The decompressed data may be stored to memory 150' and/or provided to a further processing system (e.g., in a CPU or GPU) for further processing. As shown in FIG. 1B, the decompressed data generated by the decompressor 20 may include a sparse matrix array 106a, a compacted sparse matrix array 106b, a transposed sparse matrix array 106c, and/or a compacted transposed matrix array 106d.

A command CPU/GPU 140' generates requesting decompressed data may indicate which one or more different data formats the decompressor 20 needs to generate. In some example, a plurality of decompressors or decompression operations may operate in parallel to decompress the compressed data into plural different data formats 106a, 106b, 106c, 106d.

In some embodiments, the decompressor 20 may be provided inside of the memory 150' to register file load path of the CPU/GPU 140'. In one example, the compressed data 102 may be stored in the memory 150', and as the instruction to perform an operation using the matrix data is received, the decompressor 20 disposed in the path between the memory 150' and the register file of the CPU/GPU 140', may provide one or more of the different data formats 106a, 106b, 106c, 106d needed by the operation. Up until the very last storage prior to instruction, the compressed data 102 may remain compressed, and the one or more data formats needed by the operation is generated as needed in the register file.

Deep Neural Networks

In some examples, the implementation of the compressor 10 and/or decompressor 20, according to various embodiments disclosed in this specification, may be used in machine learning applications to store, transfers and/or process large volumes of data stored in matrices. The matrix data is compressed and decompressed at various stages to reduce system storage and/or communication resources, and increase computation speeds.

As one example, a deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy.

Figure 2A:
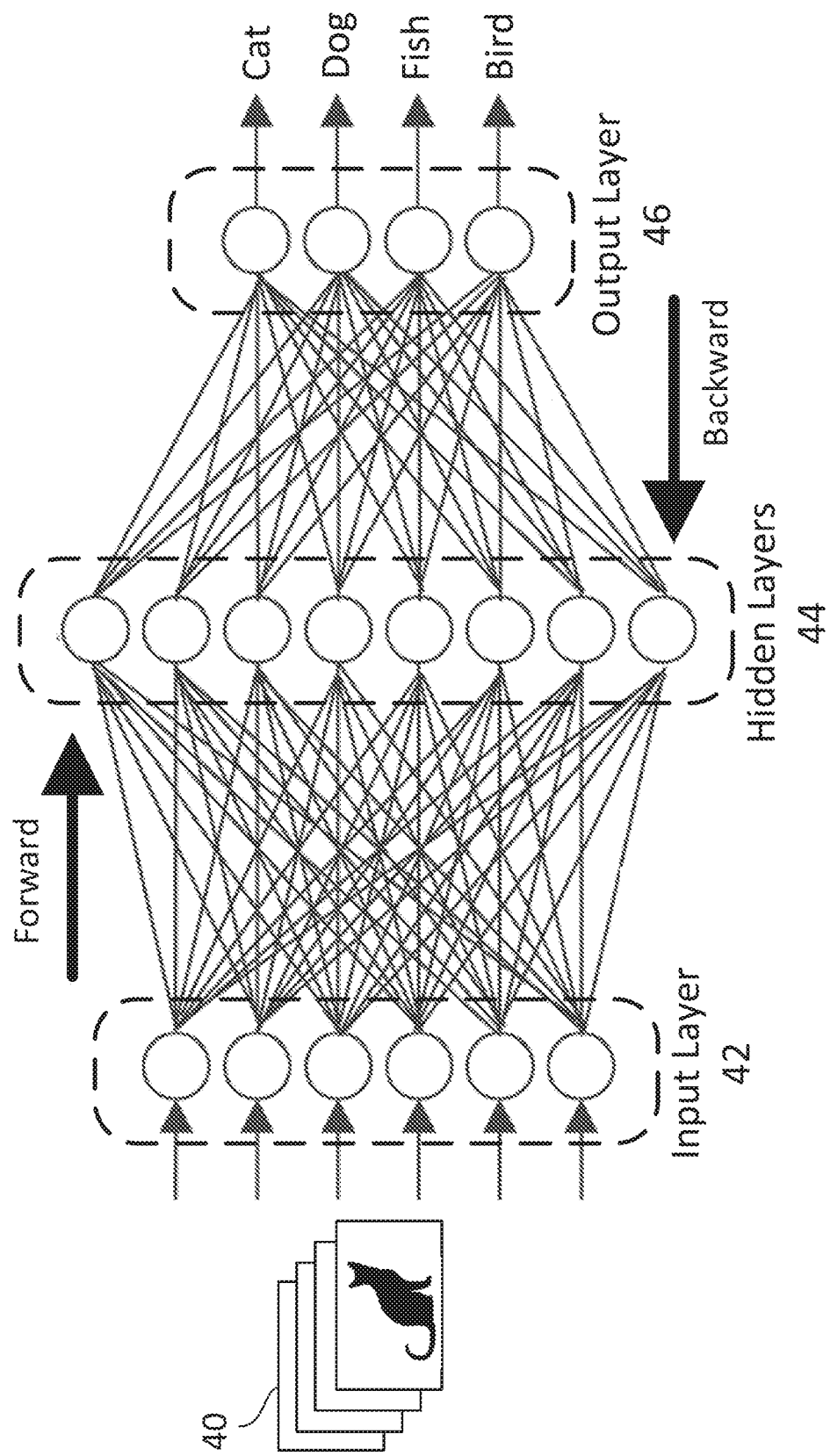
FIG. 2A shows an example of training a neural network to recognize certain animals.

FIG. 2A illustrates training of a neural network to recognize certain animals. The neural network includes an input layer 42, a plurality of hidden layers 44, and an output layer 46. The training process adjusts weights of neuron connections in the neural network such that correct decisions are made at the output layer 46 for data provided to the input layer 42. The neural network shown may generate sparse matrices during training (e.g., weights of coefficients) and may also generate sparse matrices during operation (e.g., observations that record the occurrence or count of an activity, preparation of data, etc.). See e.g., Brownlee, "A Gentle Introduction to Sparse Matrices for Machine Learning", https://machinelearningmastery.com/spare-matrices-for-machine-learning/; "Sparse Linear Algebra" CuSPARSE library of CUDA (NVidia Corp.) https://developer.nvidia.com/cusparse; Bell et al, "Efficient Sparse Matrix-Vector Multiplication on CUDA", NVIDIA Technical Report NVR-2008-004 (December 2008).

Figure 2B:
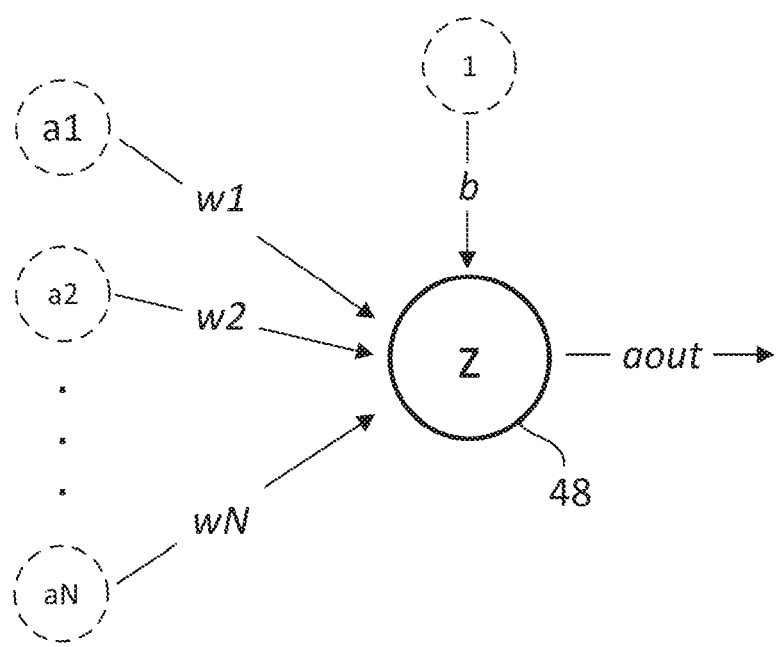
FIG. 2B shows a neuron of a neural network receiving N number of inputs from other neurons and a bias value.

In more detail, a neuron is a basic unit of a neural network. FIG. 2B illustrates a neuron 48 receiving N number of inputs from other neurons and a bias value. Each input to the neuron is multiplied by a respective weight value w. The weights represent the strength of the connection between neurons. Neurons may also include a bias input which does not receive an input from any other neurons. Weight value b is applied to the bias input. The weighted inputs and bias are summed to provide $z=\Sigma_{i=1}^{N} a_i w_i + b$. An activation function g(z), used to provide non-linearity to the neural network, is applied to the sum of the weighted inputs and bias. The output of the neuron can be represented by $a_{out}=g(z)=g(\Sigma_{i=1}^{N} a_i w_i + b)$. The weighted inputs and bias, which are developed during training, can result in large amounts of sparse matrix data that must be properly represented, stored and accessed.

For example, during training, data flows through the DNN in a forward propagation phase until a prediction is produced that indicates a label corresponding to the input. The operations in forward propagation include multiplying a weight matrix by an activation matrix. The weight matrix models the weights applied to connections between neurons in layer N and layer N+1. The activation matrix for layer N+1 is the output of that operation from layer N.

Errors between the correct label and the predicted label are analyzed, and the weights are adjusted for each feature during a backward propagation phase until the DNN correctly labels the input and other inputs in a training dataset. Backward propagation minimizes the error between the correct label and the predicted label. Backward propagation includes propagating the error back through the network's layers, adjusting the weights of the inputs to the individual neurons, and making another decision.

Backward propagation generates gradients of the activations, telling how far wrong and in what direction to move in order to generate the correct prediction. The higher the gradient, the steeper the slope of the function and the faster a network can learn. When the slope is zero, the network stops learning. Generating the gradients in backward propagation includes multiplying the activations by the transposed weight matrix. As will be discussed in more detail below, a transpose of a matrix A is a matrix AT which is formed by turning rows of matrix A into columns of matrix AT.

Forward and backward propagation may be repeated for thousands of images, each iteration resulting in revised weights of the neural network.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

In the FIG. 2A example, a number of interconnected layers including an input layer 42, an output layer 46 and many intermediate hidden layers 44 may be provided. In one illustrative example, a first layer of the DNN model breaks down an input image into various sections and looks for edges. Additional layers 44 may assemble the edges to look for higher level patterns such as basic patterns such as lines and angles and identify parts of animals such as wings, eyes, and tails. The final few layers may generate a label for the input image, identifying the object. The output layer 46 may generate the output.

As discussed above, forward and backward propagations include performing matrix multiplications operations involving matrix A and transposed matrix $A^T$. Transposing matrix A into a transposed matrix may be time consuming In addition, because neural network are large, weight and activation matrices may be very large and exceed memory available at certain memory layers of the parallel processing system such as in L1 or L2 cache memory. While more memory may be available on higher memory layers such as main memory, accessing data from such higher memory layers consumes more time. To overcome these and other challenges, example non-limiting embodiments provide for representing sparse matrices for storing and/or generating matrices in a diagonal storage format from which original matrix and/or transposed matrix may be efficiently extracted.

Sparse Matrices

Workloads processed by neural networks as discussed above can be very large and can include sparse data meaning that many values in the matrix are zero. Similarly, matrices representing characteristics of the neural network during training and inference may include sparse matrix data.

Large sparse matrices can be troublesome because they can take up a lot of storage space and cause delay when operations designed for dense matrices are performed. Accordingly, when storing and performing operations using sparse matrices, specialized data representations can be used to exploit the sparsity of the matrices to reduce storage requirements and memory latency.

Example embodiments provide systems and techniques for generating, storing, and/or performing operations using a diagonal format for storing a sparse matrix. An example non-limiting diagonal storage format includes non-zero matrix elements and a mask indicating location of non-zero elements in the original matrix. The data are consecutive non-zeroes along diagonals of the matrix. Diagonals of a 8×8 matrix are for example defined as a set elements (i, j) such that i−j=k (mod 8). The matrix has 8 diagonals for k=0, . . . , k=7 with k=0 being the main diagonal. An advantage of diagonal storage of example non-limiting embodiments that it is equally efficient for example non-limiting decoders to reconstruct the original version of the sparse matrix or a transposed version of the matrix because a transposition operation can be used to map the diagonal of the original matrix to a diagonal of the transposed matrix.

The diagonal storage needs only one copy of non-zeroes and of the mask (e.g., 8 bytes for an 8×8 sparse matrix). Example non-limiting embodiments include applying the diagonal storage to 8×8 matrices of 0.5 or greater sparsity, but diagonal storage is not so limited. Example embodiments may be applied on matrices with 4:8 sparsity, which is a special case of 0.5 sparsity. The diagonal storage is not limited to any particular sparsity, sparsity pattern, and/or particular block size.

Existing approaches either require two copies of non-zeroes or a large volume of metadata. The diagonal storage is optimal within 4 bits of a total of 8 bytes for a mask and 64 bytes for nonzeroes (assuming half precision data).

The diagonal storage will reduce almost by 2× (two times) the amount of data storage needed for sparse weights in DNNs and other applications.

While the example non-limiting embodiments are described in connection with neural networks, the technology herein is more generally applicable to any application in which a sparse matrices and/or transposed matrices are used. For example, the technology herein could be used in context of High Performance Computing (HPC) application. As one specific example, the technology herein could be used in the context of computing flow around airplanes, where matrices include sparse data and/or transposed matrices are needed.

Compression and Decompression Overview

For an 2D N:M structured sparse matrix (where each column and row of M elements has only N nonzero values), it is desirable to store a single version of the compacted matrix using M*N storage space (plus metadata), but to be able to generate simply from this storage both the compacted+transposed and compacted+non-transposed version of the matrix. Along with appropriate metadata (either generated or stored), these versions of the matrix can be fed directly to sparse matrix multiply-accumulate (MMA) instructions.

Existing approaches to the problem of forward propagation step (fprop) and decreasing gradient (dgrad) during the backward propagation step, require non-transposed and transposed versions of the same compacted weight matrix, and do not provide the desired storage savings or do not scale for larger matrices.

As an example, one approach is to store two copies of the compacted matrix. The downside is that this requires twice as much storage as a single copy, so the net storage savings is worse than zero for a 50% dense matrix, after accounting for metadata.

Another approach is to provide a look up table, which exploits the fact that there are a limited number of possible 2D structured-sparse patterns for a given block. For example, there are only 90 possible 2D 2:4 4×4 blocks, for which transposition information can be stored in a look up table. The downside is that this approach does not scale to larger blocks (there are millions of possibilities for a 2D 4:8 8×8 block).

Storage by Diagonals

In example non-limiting embodiments, values within a diagonal of a matrix are preserved during transposition, and, further, the transpose operation is equivalent to re-ordering diagonals of a matrix. For example, consider a square sparse matrix A of size m=8 shown in FIG. 3A.

Figures 3A, 3B, 3C:
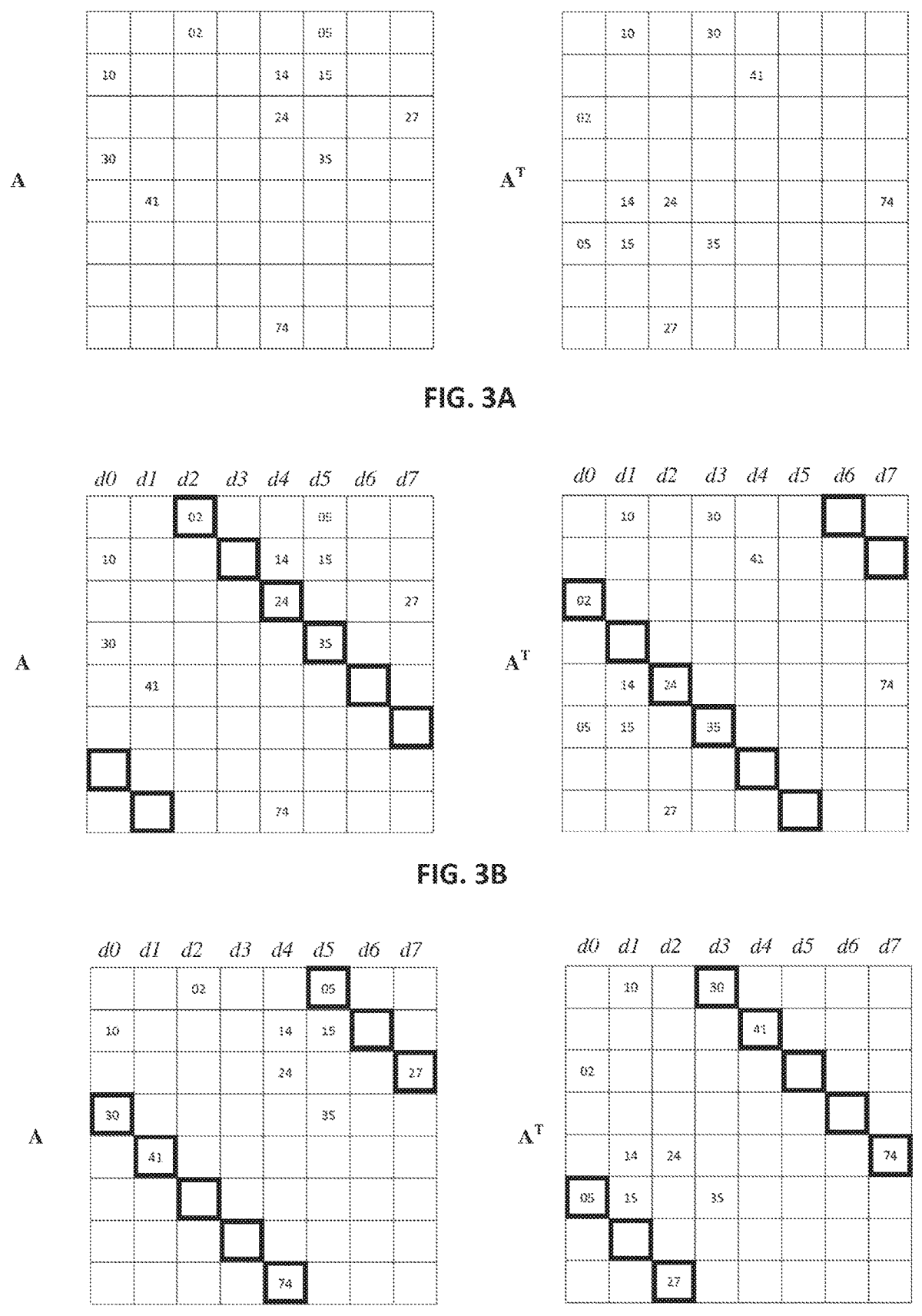

A transpose of a matrix A is a matrix AT which is formed by turning rows of matrix A into columns of matrix $A^T$. Since matrix A is sparse, its transposition $A^T$ will also be sparse. As shown in FIG. 3A, the rows of matrix A are provided as columns of transposed matrix $A^T$.

Matrix A and transposed matrix $A^T$ each include eight diagonals starting on the first row of the respective matrix. If the FIG. 3A matrix were a chess board, then the bishops and the queen could move along these diagonals except that in the example non-limiting embodiments, the diagonals all have the same number of entries and thus "wrap" to the opposite side of the matrix (such moves would not be legal in regulation chess). In FIG. 3A, the zero values are shown as being blank for ease of illustration but they actually contain $00_{hex}$ (i.e., each value is one byte long comprising two 4-bit binary nibbles in this example). Thus, as shown in FIG. 3B and following, matrix A diagonals of the FIG. 3A sparse matrix (i.e., the paths along which a bishop and the queen could move on a chessboard but with "wrapping") comprise:

d0=[00, 00, 00, 00, 00, 00, 00, 00]; (no wrapping needed)
d1=[00, 00, 00, 00, 00, 00, 00, 00]; (wrap to lowest lefthand square)
d2=[02, 00, 24, 35, 00, 00, 00, 00]; (wrap as shown in FIG. 3B)

d3=[00, 14, 00, 00, 00, 00, 00, 00]; (wrap to 6th row)
d4=[00, 15, 00, 00, 00, 00, 00, 00]; (wrap to 5th row)
d5=[05, 00, 27, 30, 41, 00, 00, 74]; (wrap as shown in FIG. 3C)
d6=[00, 00, 00, 00, 00, 00, 00, 00]; (wrap to third row)
d7=[00, 10, 00, 00, 00, 00, 00, 00]. (wrap to second row)

Transposed matrix $A^T$ diagonals shown in the righthand side of FIGS. 3A, 3B, 3C include:
d0=[00, 00, 00, 00, 00, 00, 00, 00];
d1=[10, 00, 00, 00, 00, 00, 00, 00];
d2=[00, 00, 00, 00, 00, 00, 00, 00];
d3=[30, 41, 00, 00, 74, 05, 00, 27];
d4=[00, 00, 00, 00, 00, 15, 00, 00];
d5=[00, 00, 00, 00, 14, 00, 00, 00];
d6=[00, 00, 02, 00, 24, 35, 00, 00]; and
d7=[00, 00, 00, 00, 00, 00, 00, 00].

As can be seen from this example, diagonal d0 in matrix A and transposed matrix $A^T$ happen to be the same, i.e., all zeros. Other diagonals in matrix A are provided at other positions in transposed matrix $A^T$, but the order of the zero value elements and nonzero-value elements stay the same.

For example, as shown in FIG. 3B, matrix A diagonal d2=[02, 00, 24, 35, 00, 00, 00, 00] corresponds to transposed matrix AT diagonal d6=[00, 00, 02, 00, 24, 35, 00, 00]. Transposed matrix $A^T$ diagonal d6 contains elements 02, 24, and 35 in the same order as in the original untransposed matrix (with respect to the same zero-valued positions). The difference is that matrix A diagonal d2 now starts on column (m-d) % m→(8-2)%8=d6, and its elements have been cyclically shifted down by d=2 positions.

As another example, shown in FIG. 3C, matrix A diagonal d5=[05, 00, 27, 30, 41, 00, 00, 74] corresponds to transposed matrix $A^T$ diagonal d3=[30, 41, 00, 00, 74, 05, 00, 27]. Transposed matrix $A^T$ diagonal d3 contains non-zero elements 05, 27, 30, 41, and 74 in the same order (with the same zero-valued positions) as in the untransposed matrix. Matrix A diagonal d5, in the transposed matrix $A^T$ starts on column (m-d) % m→(8-5)%8=3, and its elements have been cyclically shifted down by d=5 positions.

To store a sparse matrix in diagonal format, two data structures are used in example non-limiting embodiments:
1) A vector D containing the compacted nonzero values along each of a succession of diagonals in turn (i.e., all zero values from the diagonals are removed, so the data representation is "compacted" meaning made more compact by removing zero values). Size of the vector depends on the number of nonzero values.
D=[02, 24, 35, 14, 15, 05, 27, 30, 41, 74, 10]
2) A bit-mask M of size m*m, indicating zero/nonzero status for each position in each row of matrix A (in other words, since the vector D includes no information from which the position of each non-zero element in the matrix could be unambiguously determined, an additional mask is used to specify the matrix position of each non-zero value). For example, a bitmask in hexadecimal could comprise the following values:
M=0x4213091220000001

Figure 4:
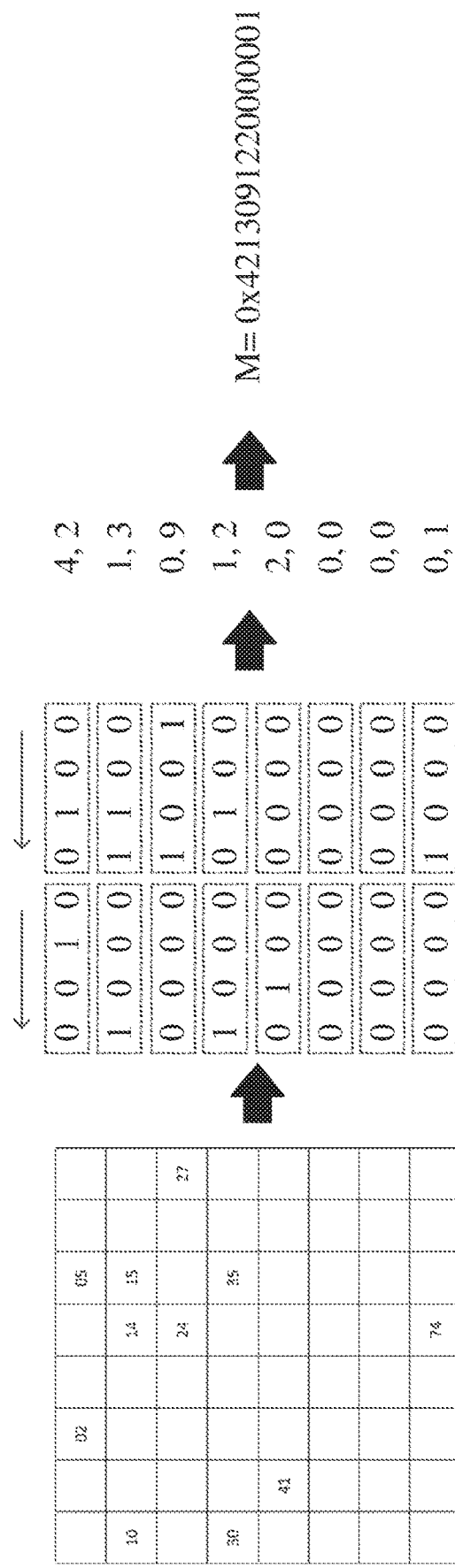
FIG. 4 shows process for obtaining a bitmask of a matrix.

FIG. 4 illustrates an example non-limiting process for determining a hex representation of matrix A bit-mask M. A bit is used to indicate whether each element location in the matrix is a zero or non-zero valued element. In the mask, a "0" represents zero valued elements and "1" represents non-zero valued elements. Each group of 4 bits is converted to a hex value, with the bits being read from right to left.

From vector D and bit-mask M, the prefix sum of values in rows of the matrix can be computed (and stored with, or generated at runtime from, the above data). This will indicate where in the compacted output each diagonal's values will be.

With this stored or generated data, the example non-limiting decoder(s) of non-limiting embodiments can generate any of four potential outputs, depending on the use case (e.g., need by an application):
1) Original matrix, A;
2) Compacted matrix, AC, and metadata, $A_m$;
3) Transposed matrix, $A^T$; and/or
4) Transposed compacted matrix, $A^T C$ and metadata, $A^T_m$.

In some example non-limiting implementations, the compacted matrices and metadata may be ready for input to sparse Matrix Multiply Accumulate instructions.

The approaches disclosed in this application are not limited to structured sparsity or any particular block size. The approaches can work with 2:8 sparsity, 4:16 sparsity, 8:16 sparsity, or even general 25% or 50% density without a structure. In some embodiments, interaction with sparse Matrix Multiply Accumulate may require a compliant sparsity pattern.

In some example non-limiting implementations, the storage format is not limited to sparse matrices but rather may be applied to matrices with densities higher than 50%. Matrices with these higher densities may need higher overhead to obtain the matrix or transposed matrix from the stored data.

Methods and Systems for Representing Matrices by Diagonals

Figure 5A:
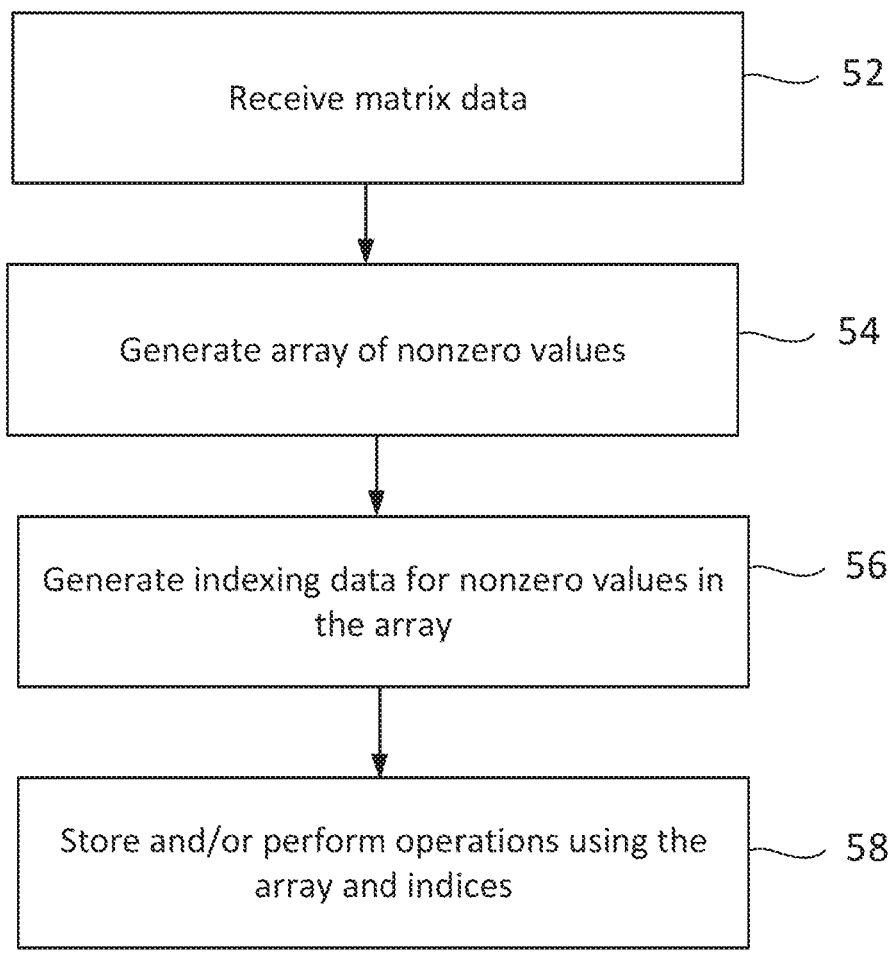
FIG. 5A illustrates an example non-limiting method for representing matrices by diagonals.

FIG. 5A illustrates an example non-limiting method 50 for representing matrices by diagonals. The method may be performed by a processor (e.g., one or a plurality of CPUs and/or GPUs) executing software instructions stored in non-transitory memory and/or a hardware-based processing circuit(s). In some example non-limiting implementations, the method may be performed by a software and/or hardware encoder.

The method 50 includes receiving matrix data 52. The matrix data may be received in response to commands to access the matrix data from memory. The matrix data may comprise a sparse matrix in which most of the elements are zero. In some embodiments, the matrix data may comprise a dense matrix in which most elements are nonzero. If the matrix data is compressed, the method may include decompressing the matrix data into a format needed for performing the operations.

The method includes generating a diagonal storage format which includes extracting a stream of nonzero values from the received matrix data 54 and indexing data for determining position of the nonzero values in the array 56. The array lists nonzero matrix values along each diagonal of the matrix in turn. The size of the array will depend on the number of non-zero values in the matrix.

The indexing data provides information needed to specify and/or determine, for each nonzero value, where the nonzero value is positioned in the (1) matrix, (2) compacted matrix, (3) the transformed matrix, and/or (4) the transposed compacted matrix. In one example, a bit-mask having a bit corresponding to each element of the matrix may indicate whether each position of the matrix has a zero or a nonzero value. The bitmask may be pre-processed to indicate the position of the nonzero value in a compressed format. The indexing data may be generated only for the nonzero values. A convention is used so that the order of bits in the bitmask has predetermined correspondence with positions in the (or a) matrix.

For example, the indexing data may indicate the diagonal number or other identifier for each nonzero value and where in the identified diagonal the respective nonzero value is located. In one example, the indexing data indicates the diagonal number and matrix row number for each nonzero value. The indexing data can be used to reconstruct the original matrix, compacted matrix, transposed matrix, and/or transposed compacted matrix.

In some example non-limiting implementations, the bit-mask is pre-processed into a function S indicating number of non-zeros on each diagonal and function Q indicating start of diagonal, with simple bitwise summation operations. With these two functions, locations of the non-zeros elements for the original matrix, compacted matrix, transposed matrix, and/or transposed and compacted matrix can be determined.

As will be discussed in more detail below, function S is the column sum of cyclically shifted bitmask, S(k) is the number non-zeroes in k-th diagonal, and Q(k) is a prefix sum of S provides the start of k-th diagonal in the array of matrix values D. The prefix sum is the cumulative sum of a sequence of numbers, represented by $y_i=y_{i-1}+x_i$. Given array of size n, the prefix sum of the array Arr[n] is another array of same size with value of prefix sum array determined by Prefix_Arr[i]=Arr[0]+Arr[1]+Arr[2]+ . . . +Arr[i]. Using functions S and Q, a vector of length S(j) is formed for each column j in the bitmask providing indices of rows with non-zero elements.

In some example non-limiting implementations, the indexing data may indicate the row number of each non-zero element and a diagonal number of each non-zero element.

In some example non-limiting implementations, the indexing data may include a mask with the cyclically shifted by the row number. The column in the cyclically shifter mask would correspond to diagonals in the matrix.

The method may include storing the array and indexing data and/or using the array and indexing data to perform computational operations 58. The array and indexing data may be stored in shared memory/L 1 cache, L2 cache, and/or local memory (e.g., dynamic random access memory). The computational operations (e.g., matrix multiply instruction) may be configured to perform the operations by directly using the array and indexing data, without decompressing the data to generate the original matrix, compacted matrix, transposed matrix, and/or transposed and compacted matrix. As an example, a first matrix represented by stored by diagonals storage format may be multiplied by a second matrix stored by diagonals storage format, without decompressing the data, to generate a third matrix with diagonals storage format. The operations may include matrix multiply operations, but are not so limited.

Example Schematic Representation of an Encoder

Figure 5B:
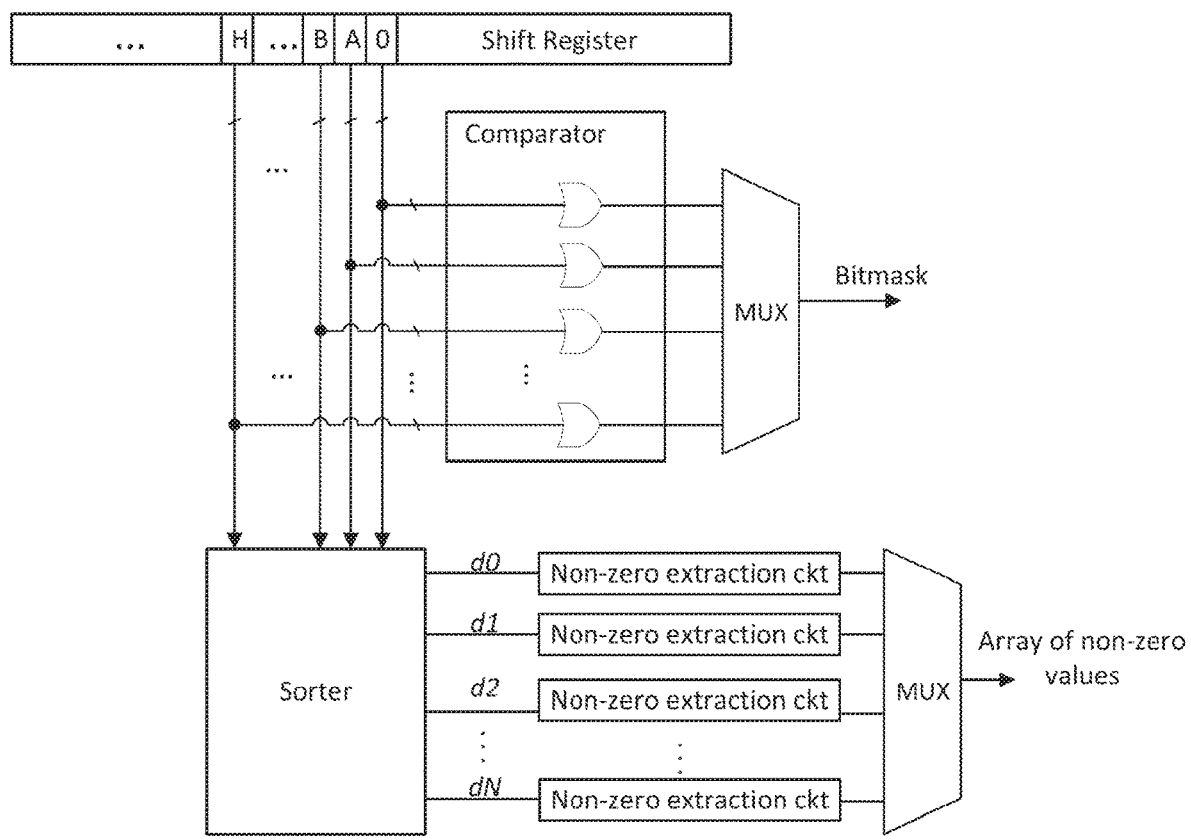
FIG. 5B illustrates an example non-limiting schematic representation of an encoder that may generate compressed data in the diagonal storage format.

FIG. 5B illustrates an example non-limiting schematic representation of a hardware-based encoder that may generate compressed data in the diagonal storage format. The output of the system in FIG. 5B is a bitmask indicating location of non-zero elements in an input matrix and array of non-zero values in diagonal order. In other examples, instead of the bitmask, other metadata may be generated to specify the location of non-zero elements of the original and/or transposed matrix and/or from which the location of the non-zero elements in the matrix and/or transposed matrix may be determined.

FIG. 5B shows an example shift register (e.g., allocated in cache memory) that permits hardware logic circuits to scan the matrix and generate the mask and array of non-zero values. Other, more parallel circuits may be used to reduce the time to scan the matrix.

A stream of data includes matrix element values (e.g., a, b, c) in row order. A comparator receives the stream of input data and generates a stream of bits indicating zero and non-zero elements in the stream of input data. In one example, the comparator may include a plurality of OR gates each outputting a "zero" or "false" if value of all bits of the element is zero and outputting a "one" or "true" if the value of element is non-zero (i.e., any bit in the value is set).

The stream of data is also provided to a sorter or selector configured to sort or select the elements of the matrix into respective diagonals (d0, d1, d2, . . . dN). A non-zero extraction circuit may discard or suppress zero elements and transmit only the non-zero values to a multiplexer. The multiplexer may combine the non-zero values from each diagonal in proper order to generate a stream of non-zero values in diagonal order. As an example, the multiplexer may be controlled to output all of the non-zero values in diagonal 0, before outputting the non-zero elements in the next diagonal, and so on, until the non-zero values in all diagonals are output.

The compressed data file comprising the generated bit-mask and the array of non-zero values may be stored in memory and/or transmitted to a processing system for further processing. Further lossless compression techniques may be applied if desired to further reduce the size of the compressed data file e.g., by eliminating redundant information.

Decompression Methods and Systems

Figure 6:
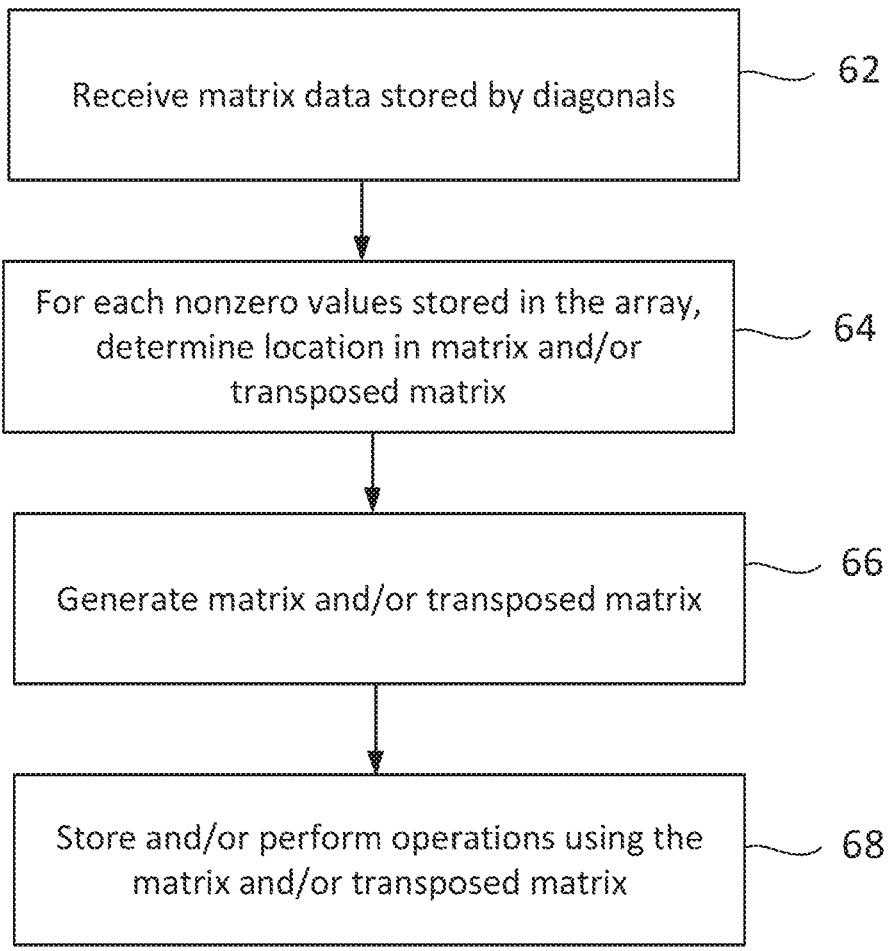
FIG. 6 illustrates an example non-limiting method for generating matrices from matrices stored by diagonals.

FIG. 6 illustrates an example non-limiting method 60 for decompressing the compressed matrix representation to for example generate matrices of any of several different formats from matrices stored by diagonals. The method may be performed by one or more processors (e.g., CPUs and/or GPUs) executing software instructions stored in non-transitory memory and/or a hardware-based processing circuit(s). In some example non-limiting implementations, the method may be performed by a software and/or hardware decoder. In some example embodiments, the decompression may be performed using tensor cores in a parallel processing operating environment such as CUDA. In some example embodiments, one or more operations of method 60 may be included in a load from memory instruction and/or arithmetic operation instruction.

The method includes receiving compressed matrix data stored by diagonals 62. The compressed matrix data stored by diagonals may include an array of nonzero values and indexing data for determining positions or locations of the nonzero values in the array.

The compressed matrix data stored by diagonals may be received in response to a request to perform computational operations (e.g., matrix multiply operations) on a matrix or transposed matrix represented by the matrix data stored by diagonals. Such a request may include a field or op code specifying the format of output matrix desired or required.

The method includes determining, for each nonzero value in the array, locations in the matrix and/or transposed matrix 64. Because the values within the diagonals of a matrix are preserved during transposition, the same indexing data can be used to determine the location of each nonzero value in the matrix and the transposed matrix. In some example non-limiting implementations, the locations in the compacted matrix and/or transposed compacted matrix may be determined for each nonzero value in the array. In some example non-limiting implementations, the matrix location for each nonzero value may be determined from function S indicating number of non-zeros on each diagonal and function Q indicating start of diagonal.

The method includes generating the matrix and/or transposed matrix 66. The matrix or the transposed matrix is generated by placing each nonzero value in the determined locations and zeros in all other locations of the matrix. The generated matrix and/or transposed matrix may be an uncompressed matrix or a compacted matrix with associated metadata.

The generated matrix, compacted matrix with metadata, transposed matrix, and/or transposed and compacted matrix with metadata may be stored in memory or used to perform computational operations (e.g., matrix multiply operations) 68. The computational operations may use the entire generated matrix, a portion of the matrix, and/or nonzero values and their locations without needing for the entire matrix to be generated.

In some example embodiments, generating the matrix and/or transposed matrix in step 66 may include determining the location of the non-zero values in the original matrix, transposed matrix, dense matrix (e.g., untransposed matrix), and/or dense transposed matrix without generating the original matrix, transposed matrix, dense matrix, and/or dense transposed matrix. The non-zero values and their determined location in the specific matrix may be used to perform the operation without generating the complete matrix.

In some example embodiments, at least a portion of the transposed matrix, dense matrix, and/or dense transposed matrix may be determined without generating and/or storing intermediate results, one or more intermediate matrices, and/or an entire matrix (e.g., original matrix, transposed matrix, and/or dense original matrix).

In some examples, a dense matrix may be generated from the matrix data stored by diagonals without generating and/or storing the original matrix. In some examples, a transposed matrix may be generated from the matrix data stored by diagonals without generating and/or storing the original untransposed matrix. In some examples, a transposed dense matrix may be generated from the matrix data stored by diagonals without generating and/or storing the original untransposed matrix and/or the transposed matrix.

Figure 7:
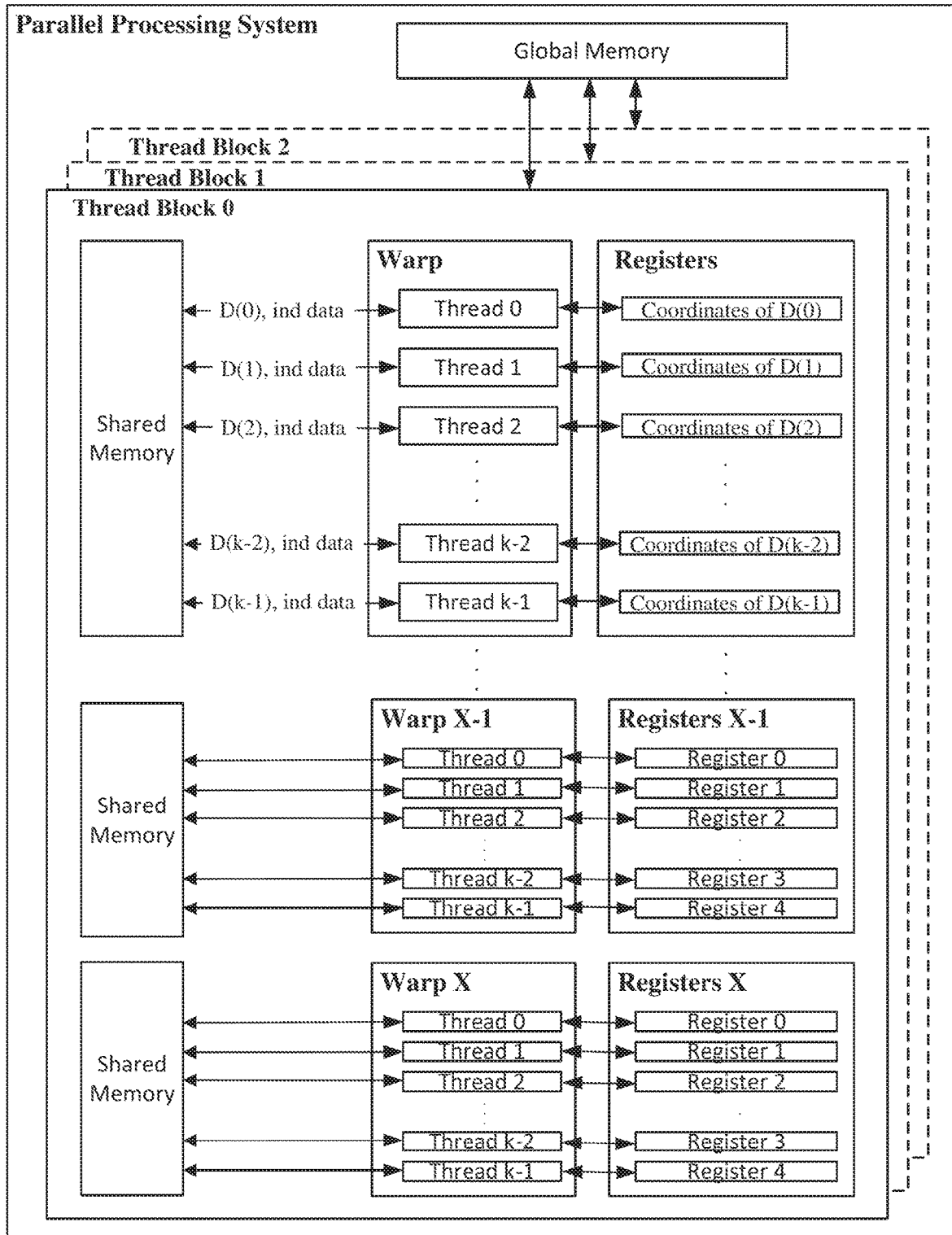
FIG. 7 illustrates an example non-limiting parallel processing system.

Example Implementation for Assigning Threads to Compute Destination Index of Nonzero Elements Stored in Diagonal Format In some example non-limiting implementations, the tasks of determining destination indices of each non-zero element may be assigned to different threads in a parallel processing system. FIG. 7 illustrates an example non-limiting parallel processing system. While FIG. 7 illustrates a specific arrangement of parallel processing system components, embodiments of this disclosure are not limited to the arrangement of the illustrated parallel processing system. In some example embodiments the parallel processing system shown in FIG. 7 is streaming multiprocessor (SM) 440 discussed with reference to FIGS. 14A and 15A.

The parallel processing system may be configured to control execution of a plurality of thread blocks with a plurality of warps in each block. Each warp includes a plurality of threads (e.g., 32 threads).

Each thread can independently process and store data using the on-chip registers. Threads within a thread block can cooperate and exchange data through the shared memory. The threads can exchange data with threads in other thread blocks and/or other processing systems (e.g., CPU) via the global memory.

The determination of a destination index for each element in the array of nonzero matrix values may be performed by a different thread of the warp. As shown in FIG. 7, threads 0 to K−1 of one warp may each receive diagonal format matrix data. Each of the threads 0 to K−1 may receive a different element of array D including nonzero matrix values along each diagonal of the matrix and indexing data. The threads may determine the destination of the nonzero elements for original, transposed, original dense and/or transposed dense matrices without needing to generate and/or store intermediate results (e.g., untransposed sparse matrix, untransposed dense matrix, and/or transposed dense matrix).

Based on the indexing data, the thread may determine coordinates of the element of array D, and store the element of array D and coordinates in the respective register. The coordinates may be determined for the matrix or the transposed matrix. The threads may perform the computations in parallel. The results in the registers may provide a dense matrix or a dense transposed matrix. In some examples, the determined matrix and/or transposed matrix coordinates of the nonzero values may be used to perform operations (e.g., linear algebra operations) without reconstructing the matrix or the transposed matrix.

The indexing data provided to the registers may include array S indicating column sums of shifted bitmask of the matrix, array Q indicating prefix sum of S, and row positions of nonzero elements in a shifted bitmask of the matrix. Each thread may compute the diagonal number and row number of the assigned of the assigned element. In one example, the indexing data provided to the registers may include index data providing column and row positions of nonzero elements in a bitmap with rows greater than zero being cyclically shifted by the row number.

Each warp may be assigned to determine destination indexes of nonzero elements stored in diagonal format for a different matrix or different block of a large matrix. Similarly, different thread blocks may be assigned to determine destination indexes of nonzero elements stored in diagonal format for a different matrix or different block of a large matrix. The threads in one or more warps and/or one or more thread warps may be executed in parallel.

More Detailed Examples for Matrix Represented by Diagonals

Storing Matrix by Diagonals

A diagonal in square matrix of the size N is set of elements $a[i,j]$ such that $i-j=k \mod N$. The diagonals are invariant under matrix transposition, i. e. transposition maps diagonals of a matrix into diagonals of a transposed matrix. Specifically, matrix of size N has N diagonals indexed by $0, \ldots, N-1$. K-th diagonal of a transposed matrix is an image of (N−1−k)-th diagonals of the original matrix. The elements of the k-th diagonal are cyclically shifted by k elements of the (N−1−k)-th diagonal. In other words, element $A[j, (k+j) \mod N]$ in the transposed matrix equals element $A[(k+j) \mod N, j]$ of the original matrix.

If the matrix is sparse and each diagonal is represented by indices of its elements, then to get the k-th diagonal of the transposed matrix, k (mod N) is added to index of element of a diagonal N−1−k.

Consider an example of 8×8 matrices with at most 4 non-zeros per row. The matrix can be represented by a vector D of 32 non-zeroes and a 64-bit mask M marking non-zeroes in the matrix. There may be one byte per row. This representation is close to the optimum. There are 162 (=8+28+56+70) possible rows with at most 4 non-zeroes. Total number of 8×8 matrices with at most 4 non-zeroes per row is 162^8. Log of this number, 58 is the minimal number of bits needed to uniquely identify a matrix of this type.

In summary, for [4, 8] sparsity the overhead is 8 B, vs 64 (32×2) B of data, or 12.5%. This overhead is 6 bits off the optimum.

Conversion Diagonal Format to Original Matrix and Transposed

Figure 8:
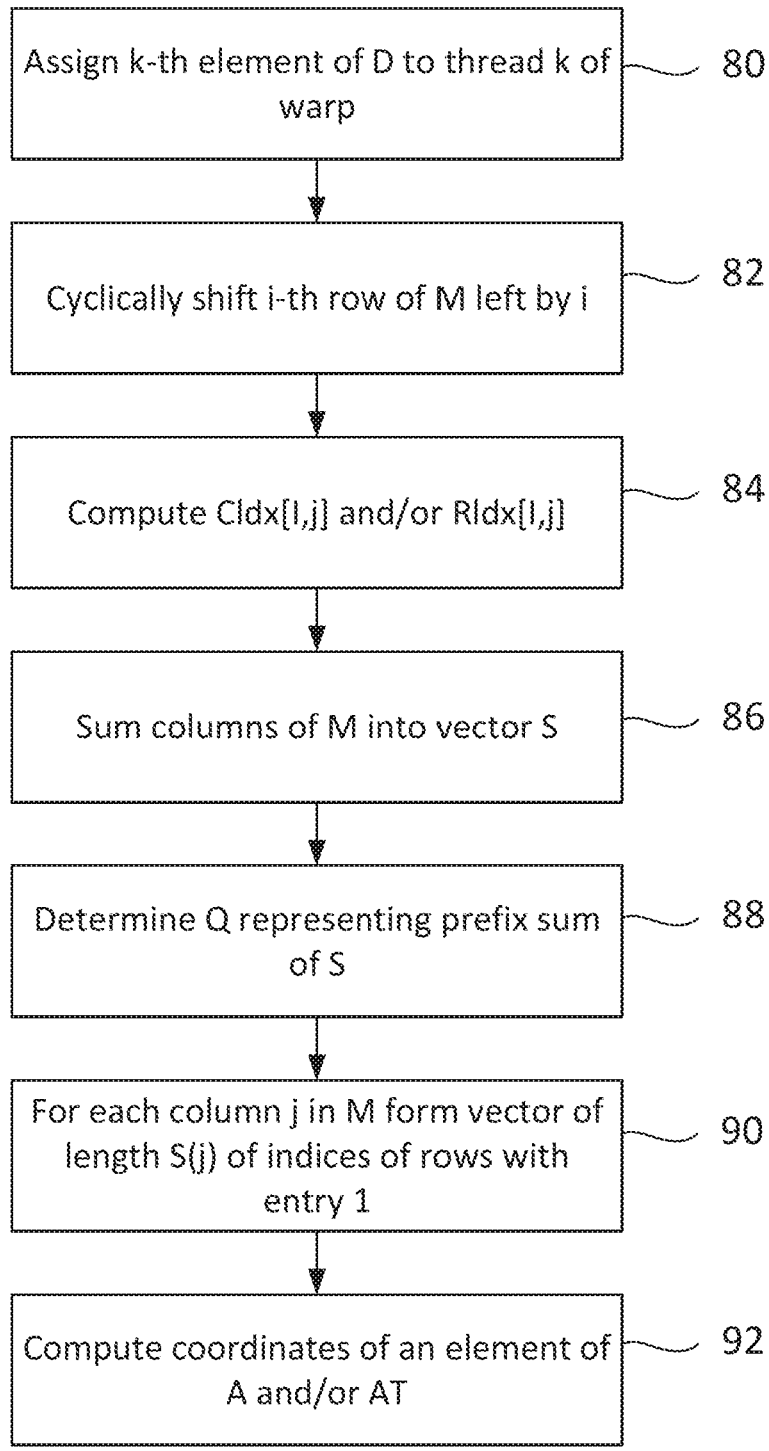
FIG. 8 illustrates an example non-limiting method of converting diagonal format to original matrix and/or transposed matrix.

It will now be shown how array D, listing at most 32 non-zeros along diagonals, and the matrix mask M can be used to construct 8×8 matrix A and A^T. FIG. 8 illustrates an example non-limiting method of converting diagonal format to original matrix and/or transposed matrix.

The operations shown in FIG. 8 may be performed by one or more processors (e.g., CPUs and/or GPUs) executing software instructions stored in non-transitory memory and/or a hardware-based processing circuit(s). In some example non-limiting implementations, the operations may be performed by a software and/or hardware decoder. In some example embodiments, the operations may be performed using tensor cores in a parallel processing operating environment such as CUDA. In some example embodiments, one or more operations of shown in FIG. 8 may be included in a load from memory instruction and/or arithmetic operation instruction.

A K-th element of vector D listing nonzero values in the matrix is assigned to thread k of the warp and computation of the destination index on this element is assigned to the thread (step 80).

First, i-th row of M is cyclically shifted left by i (step 82). Then M[i, j] is 1 only if j-th element of i-th row is non-zero in the original matrix A.

Then, using M, computation is performed of CIdx[i, j] function that equals column number of j-th non-zero in row i-th of M, i=0, ..., 7, j=0, ..., 3 (step 84). The last follows from the fact that there are at most 4 non-zeroes in each row. CIdx[I, j] will be used in a sparse Matrix Multiply (HMM) instruction. Similarly, RIdx[i,j] will be computed for transposed matrix AT.

Then columns of M are summed into row vector S (step 86). S[j] will be number of non-zeros on diagonal j. Letting Q be prefix sum of S, then Q[j] will be start of diagonal j in vector D (step 88).

The method includes, for each column j in M, forming a vector of length S[j] of indices of rows with entry 1, let it be R[j, i], i=0, ..., S[j]−1 (step 90).

Using Q and R we can compute coordinates of an element of A and/or AT which should be assign value of D (step 92):

$$A[R[j,i],j+R[j,i]]=D[Q[j]+i], i=0, \ldots, S[j]-1; \text{ and}$$

$$AT[R[j,i]+j,R[j,i]]=D[Q[j]+i], i=0, \ldots, S[j]-1.$$

Computing Function R

The function R[j, i] is computed for each column j of mask M independently. One column of M can be represented as a Byte. R for byte B returns a list of positions of ones in B. Since k=Q[j]+i assumes values from 0 to 31 at most once, R[j, i] can be represented as Idx[k]. It means that each of threads in the warp will compute J[k] and Idx[k] that are needed for assigning right values to A or AT.

Introducing a stair case function J[k] that takes one step on each segment of diagonal in D. Another words, J(k) tells diagonal number of the element of D assigned to thread k. Idx[k] indicates the row number of nonzero element k in D.

After J(k) and Idx[k] are computed the permutations above can be simplified:

$$A[Idx[k],J[k]+Idx[k]]=D[k]; \text{ and}$$

$$AT[Idx[k]+J[k],Idx[k]]=D[k].$$

This representation will be a base for direct conversion of a pair of sparse matrices represented by diagonals to a dense 8×8 matrix and index functions needed for sparse Matrix Multiply and Accumulate (e.g., FP 16 HMMA) or Warp Matrix Multiply and Accumulate (WMMA) instruction in CUDA 9 or other CUDA versions. The WMMA allows loading or initializing values into the special format for the tensor cores, performing matrix multiply-accumulate (MMA) steps, and storing values back out to memory. During program execution multiple Tensor Cores can be used concurrently by a full warp. This allows the warp to perform a 16×16×16 MMA at very high throughput. In some embodiments, the instruction for generating the original matrix, transposed matrix, compacted original matrix, and/or compacted transposed matrix from the matrix data stored by diagonals may be put in the matrix multiply instruction.

Figure 9A:
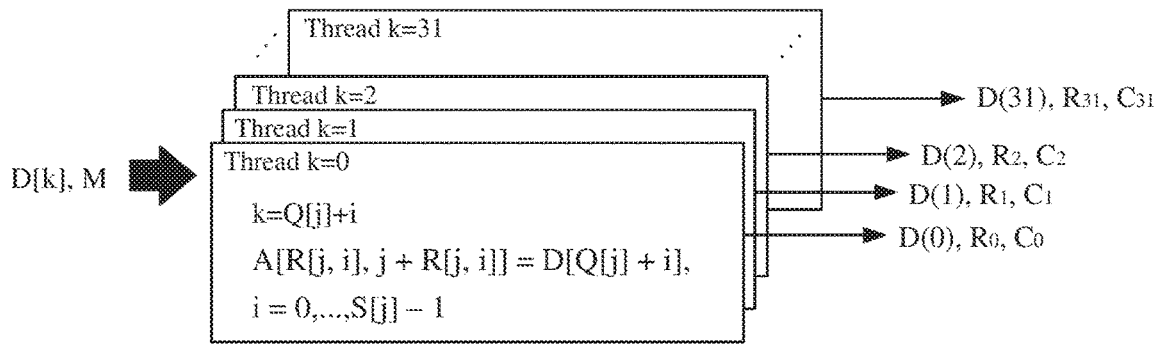
FIGS. 9A and 9B show example non-limiting implementation of converting diagonal format to original matrix and/or transposed matrix using a plurality of threads.
Figure 9B:
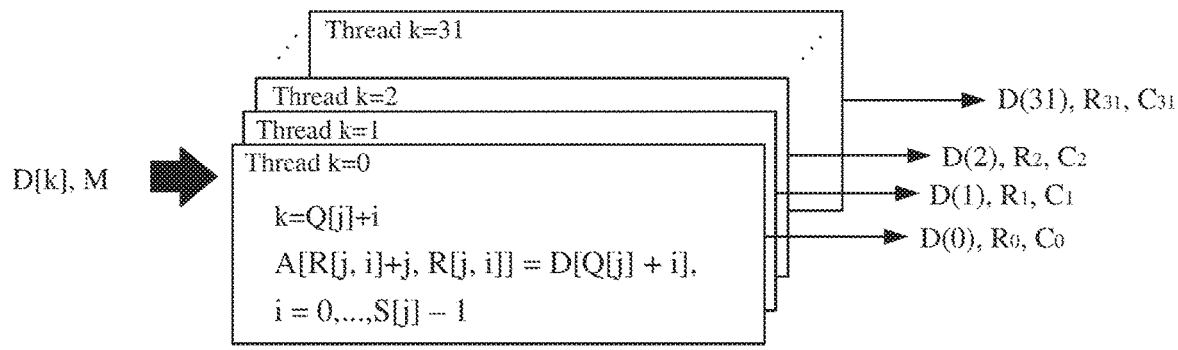

FIGS. 9A and 9B show example non-limiting implementation of converting diagonal format to original matrix and/or transposed matrix using a plurality of threads. FIGS. 9A and 9B show a plurality of threads receiving vector D of compacted nonzero values along each diagonal in turn and a matrix bit mask M indicating zero/nonzero status for each position in each row of matrix A. In the shown example, it is assumed that the vector D includes 32 elements, but embodiments of this disclosure are not so limited.

The task of determining a destination index of each non-zero element in vector D is assigned to a different thread. Each thread performs operations to determine non-zero element coordinates in matrix A (shown in FIG. 9A) or transposed matrix AT (shown in FIG. 9B). The method operations discussed with reference to FIG. 8 may be performed by each thread. In some examples, a single thread may provide the coordinates to both matrix A and transposed matrix AT.

In FIG. 9A, thread 0 determines the row and column in matrix A of the first element in vector D. Thread 31 determines the row and column in matrix A of the 32 element in vector D.

In FIG. 9B, thread 0 determines the row and column in transposed matrix AT of the first element in vector D. Thread 31 determine the row and column in transposed matrix A of the 32 element in vector D.

The computations may be performed in parallel and the results may be stored in registers associated with the threads.

Figure 10A:
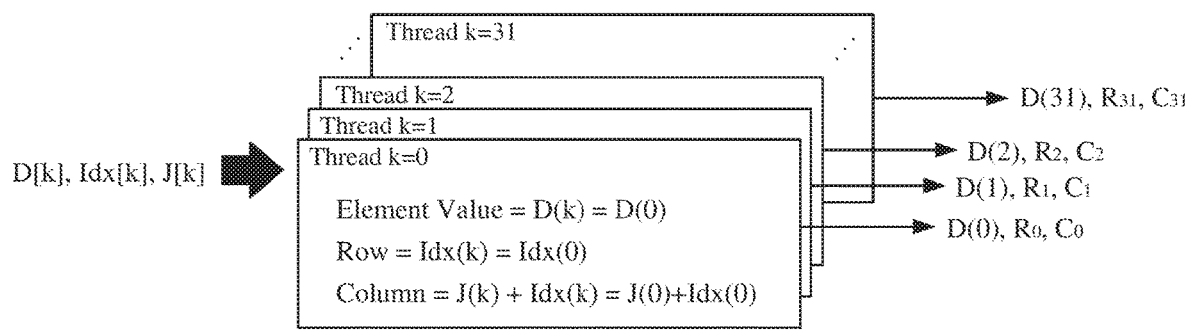
FIGS. 10A and 10B show another example non-limiting implementation of converting diagonal format to original matrix and/or transposed matrix using a plurality of threads.
Figure 10B:
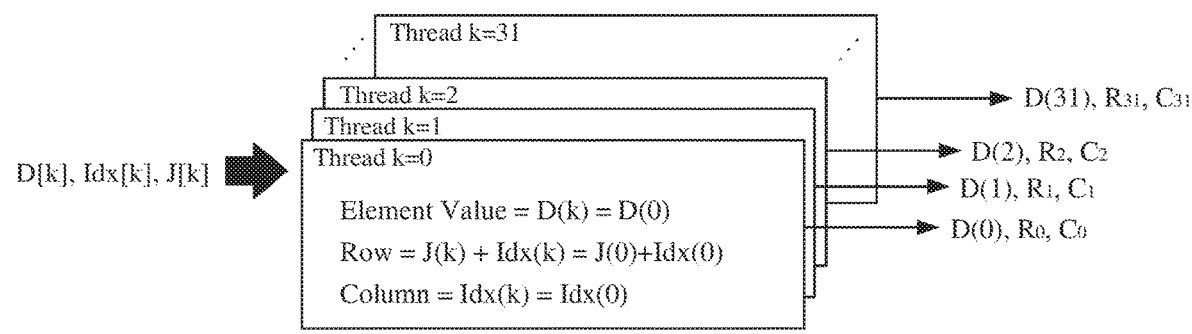

FIGS. 10A and 10B show another example non-limiting implementation of converting diagonal format to original matrix and/or transposed matrix using a plurality of threads. FIGS. 10A and 10B show a plurality of threads receiving vector D of compacted nonzero values along each diagonal in turn, vector Idx[k] indicating row number of the element of D assigned to thread k, and vector J[k] indicating diagonal number of the element of D assigned to thread k.

The task of determining a destination index of each non-zero element in vector D is assigned to a different thread. Each thread performs operations to determine non-zero element coordinates in matrix A (shown in FIG. 10A) or transposed matrix AT (shown in FIG. 10B). Each thread determines Idx(k) indicating row number of the element k in D and J(k) indicating diagonal number of the element k in D. These values are used to determine the coordinates of element k in matrix A and/or transposed matrix AT. In some examples, a single thread may provide the coordinates to both matrix A and transposed matrix AT.

Transforming into 8×4 Dense Matrix

Figure 11A:
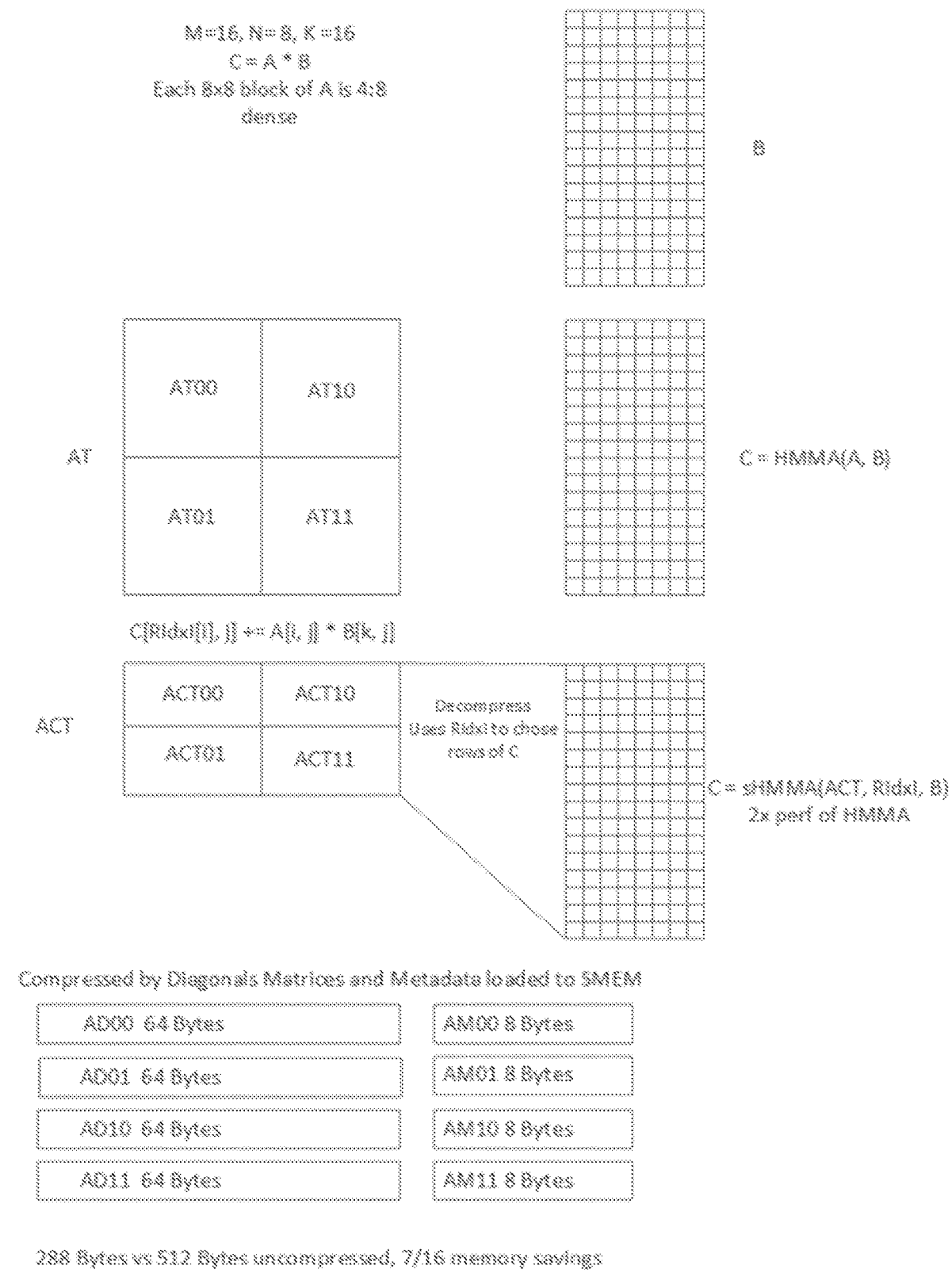
FIG. 11A shows an example non-limiting use of compressed by diagonal matrices and metadata to perform matrix multiply instruction.

FIG. 11A shows an example non-limiting use of compressed by diagonal matrices and metadata to perform a matrix multiply instruction. Matrix A is 16×16 with at most N=8 nonzero values in each column and row, and k=16 nonzero values. Matrix A is multiplied by matrix B to obtain matrix C. Matrix A can be represented by four blocks, where each 8×8 block of matrix A is 4:8 dense in this particular example.

As shown in FIG. 11A, matrix A can be compressed and stored using 288 Bytes. Each of the four blocks using 64 bytes to store the nonzero values and 8 Bytes to store the mask. The compression provides a 7/16 memory savings over using 512 bytes needed to store the uncompressed matrix A. Each block of matrix A stored in the diagonal format may be decompressed into a dense 8×4 matrix corresponding to the matrix A and/or a dense 4×8 matrix (see ACT00, ACT10, ACT01, and ACT11 in FIG. 11A) corresponding to a transposed matrix AT.

The matrix multiply and accumulate (MMA) operation can be defined by C+=A*B. The MMA operation may include adding a matrix to A*B, which may be the result of a previous MMA operation (e.g., C+=A*B). C=A*B may be a special case of MMA. The MMA operation may include loading matrices A and B from memory into registers. Matrix C from previous operation may be stored in the registers from a previous operation. When the load operation completes, the destination registers in each thread hold a fragment of the loaded matrices.

Loading the matrices A and/or B may include decompressing the data stored in memory into a format needed for the MMA operation. For example, the load operation may include decompressing one or more matrices stored in diagonal format into dense matrix (e.g., dense matrix AC or transposed dense matrix ACT).

Next, the matrix multiplication and optionally addition is performed on the loaded matrices. When the operation completes, the destination registers in each thread hold a fragment of the result matrix C. Next, the result matrix C is stored back to the memory. Alternatively, the result matrix C may be added to matrices multiplied in the next MMA operation.

As discussed above, for use of a sparse Matrix Multiply and Accumulate (HMMA) instruction, the representation D by diagonals may be transformed into dense 8×4 matrix AC and 4×8 ACT matrices.

Two functions are defined:

CIdx(i, j)=number of non-zeroes in row i preceding a non-zero at j-th column of row i; and RIdx(i, j)=number of non-zeroes in column j preceding a non-zero at i-th row of column j.

From definitions of RIdx and CIdx functions:

$AC[Idx[k], CIdx[J[k]+Idx[k]]]=D[k]$; and $ACT[RIdx[J[k]+Idx[k]], Idx[k]]=D[k]$.

The column index functions CIdxI and RIdxI are inverse functions to CIdx and RIdx will be used for choosing matching elements of B and C.

Extensions to Other Densities

The diagonal-wise storage is not limited by 4:8 sparsity, it can be used for any type of sparsity. In some example embodiments, the sparsity can be limited by 0.5 sparsity. Only the size of array D will be changed. The metadata (mask M) is close to minimal size for cases when there are 3 or more non-zeroes per row of A.

In some example embodiments, the diagonal-wise storage can be extended to 2:8 sparsity. In the case 2:8 sparsity, 64-bit mask can be replaced with 48-bit vector M2, but computations of S, Q, R and other functions would need another step. M2 is a vector of 8 pairs, one pair per row. First and the second elements of the pair represent columns of the first and the second non-zero in the row.

Mask M can be computed from M2 using the formula $M[i, M2[i, 0]+i]=1$ and $M[i, M2[i, 1]]=1$. All other operations for converting D into AC and ACT are the same as in in case of 0.5 sparsity.

Extension to Large Matrices

For 16×16 matrix with 8×8 blocks of 0.5 sparsity, all operations will be done by 4 warps independently working on each block.

DLSM Instruction

In some example embodiments, memory load instructions may include converting retrieved compressed matrix data into a needed format. For example, a memory load instruction may include retrieving matrix data stored in a diagonal storage format from a shared memory, decompressing the data into another format (e.g., dense matrix or dense transposed matrix), and writing the decompressed data to registers. DLSM instruction is an example of a memory load instruction which can provide dense matrices from compressed matrix data stored by diagonals.

DLSM loads four 4:8 matrices stored by diagonals from shared memory into the register file. Result of the instruction is a 16×8 dense matrix written in registers similar to LDSM instruction and metadata pointing to the row of matrix B corresponding to the element of A, as described in the sHMMA instruction.

For each block of matrix A of the block compressed by diagonals and metadata assumed to be loaded into shared memory (SMEM). DLSM instruction will scatter each block into registers as 8×4 matrix. All 4 matrices will form 16×8 matrix. Each block is loaded independently of each other by 32 threads (warp), one thread per non-zero in the block.

The addresses of the destinations of compressed elements are computed using the functions described in previous sections and are summarized here.

M is 8 byte mask (64 bits total) representing non-zeroes in the block.

Compute CIdx(i, j)=number of ones in row i preceding to a non-zero at j-th column of row i. This function tells column number of non-zero in A in the matrix AC (block number 00, . . . , 11 is skipped here).

Then compute CIdxI(i, j), the inverse function of CIdx. CIdxI(i, j)=column number of j-th non-zero in row i. The function CIdxI will be used as metadata for sHMMA instruction.

If AT matrix is needed, row variants RIdx and RIdxI of CIdx and CIdxI are used.

Then indices needed for finding addresses of the elements of vector D in AC are computed. The computation includes: Circularly shift i-th row of M by i bits to the left; Computing function S(j)=column sum of M; Compute function Q(j) prefix sum of S; Computing function R[i, j]=row number of i-th-non zero in column j; and Computing function J(k) that indicates diagonal number of element D[k].

Example Schematic Representation of a Decoder

Figure 11B:
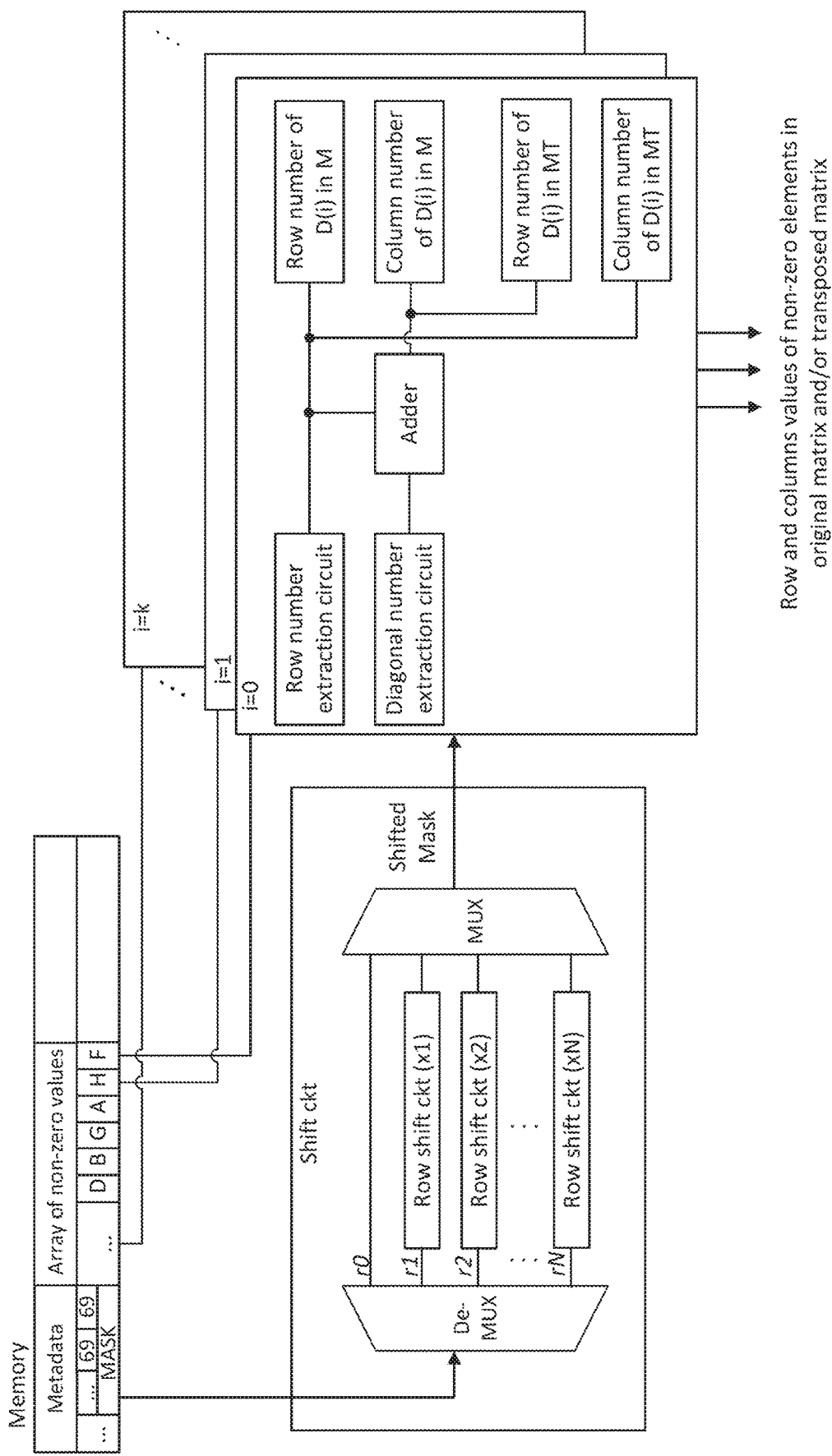
FIG. 11B illustrates an example non-limiting schematic representation of a decoder that may generate decompressed data from data in the diagonal storage format.

FIG. 11B illustrates an example non-limiting schematic representation of a decoder that may generate decompressed data from data in the diagonal storage format. The output of the system in FIG. 11B generates row and columns values of non-zero elements in original matrix and/or transposed matrix.

As shown in FIG. 11B a shift circuit receives a bitmask indicating location of non-zero elements in a matrix and generated a cyclically shifted bitmask. The shift circuit is configured to cyclically shift the rows of the bitmask by the row number. The columns in the cyclically shifted bitmask correspond to rows in the original matrix. In one example, a de-mux may receive a stream of bits and send respective row shift circuits configured shift the bits by the row number. A multiplexer may reconstruct the shifted rows into a stream of bits representing the cyclically shifted bitmask.

The shifted mask is provided to a plurality of circuits configured to determine row and diagonal numbers of the non-zero values. As shown in FIG. 11B, each non-zero value may be provided to a different circuit which determines the row number and column number of the non-zero value. A row number extraction circuit may determine the row in the shifted mask which corresponds to the non-zero value and the diagonal number extraction circuit may determine the column number in the shifted mask which corresponds to the nonzero value. These values are used to determine the row number and column number of the non-zero value in the original matrix and/or transposed matrix.

The row number of the non-zero element in the original matrix is provided by the row determined by the row number extraction unit. The column number of the non-zero element in the original matrix is provided by the adder combining the row determined by the row number extraction unit and the diagonal determined by the diagonal number extraction circuit.

The row number of the non-zero element in the transposed matrix is provided the adder combining the row determined by the row number extraction unit and the diagonal determined by the diagonal number extraction circuit. The column number of the non-zero element in the transposed matrix is provided by the row determined by the row number extraction unit.

The row and columns values of non-zero elements in original matrix and/or transposed matrix may be used to reconstruct the original and/or transposed matrices and/or reconstructed compacted versions of the original and/or transposed matrices.

Illustration for 2:4 Case

Figures 12A, 12B:

FIGS. 12A-12C illustrate matrix representation by diagonals for a matrix having 4 elements and 2 nonzero values per row.

FIG. 12A illustrates matrix A and a compacted matrix AC with metadata that may be used for a sparse Matrix Multiply and Accumulate instruction. The compacted matrix AC elements include A,B/C,D/E,F/G,H and metadata of the compacted matrix includes 2, 1/1, 2/2, 1/1, 2=6, 9, 6, 9.

A compacted transposed matrix $AC^T$ can be represented by elements C,G/A,E/B,F/D,H and metadata of the compacted matrix includes 2,0/3,1/3,1/2,0.

Storage by diagonals includes extracting an array D of nonzero elements in matrix A. As illustrated in FIG. 12B, an array D=[F, H, A, G, B, D, C, E] lists non-zero elements of each matrix diagonal starting with diagonal d0. Each diagonal of matrix A with each diagonal starting on row 0 of the matrix.

FIG. 12C illustrates the bit-mask nnz_mask and bitmask nnz_mask after cyclic shift. Bit-mask nnz_mask is generated with ones representing locations of the non-zero elements and zeros representing zero valued elements in the matrix A. The hex representation of the matrix bit-map is 0x6969.

Next, the rows of the bitmask nnz_mask are cyclically shifted. Specifically, the ith row of the bitmask nnz_mask is cyclically shifted by i to the left. After the cyclic shift, row 0 remains the same, row 1 after being shifted by 1 to the left is 0011, row 2 after being shifted left by 2 is 1001, and row 3 after being shifted left by 3 is 1100. The hex representation of the cyclically shifted matrix bit-map is 0x6C93. Each column of the shifted bitmask nnz_mask corresponds to diagonals of the original matrix.

The column sums of the shifted nnz_mask is 2222 and are represented by vector S=[2, 2, 2, 2]. S(j) represents the number of non-zeros in diagonal j. Accordingly, S(0)=2 indicates that the number of non-zeros in diagonal 0 is two.

The prefix of column sums is 2468 and are represented by vector Q. Q(j) will be the start of diagonal j in vector D. Q[0]=0, Q[1]=2, Q[2]=4, and Q[3]=6.

Index function format: diagonal number (column number in M mask) followed by row numbers of non-zero elements along this diagonal (column of M mask).

0: 2 3
1: 0 3
2: 0 1
3: 1 2

Based on the index function format, the function R[i, j]=row number of the i-th non-zero in column j is computed. R[0, 0]=2, R[0, 1]=3, R[1, 0]=0, R[1, 1]=3, R[2, 0]=0, R[2, 1]=1, R[3, 0]=1, and R[3,1]=2.

The coordinates of an element of the matrix or transposed matrix which is assigned a value of D is computed using Q and R. The coordinates of an element in diagonals j of the original matrix are provided by:

$A[R[j,i],R[j,i]+j]=D[Q[j]+i]$, where $j$=column number, $i=0, \ldots, S[j]-1$, and $Q[j]+i=k$.

====Reconstruction of the Original Matrix:

$A[R[0,0],R[0,0]+0]=AC[Q[0]+0]$ or $A[2,2]=D[0]=F$ $A[R[0,1],R[0,1]+0]=AC[Q[0]+1]$ or $A[3,3]=D[1]=H$ $A[R[1,0],R[1,0]+1]=AC[Q[1]+0]$ or $A[0,1]=D[2]=A$ $A[R[1,1],R[1,1]+1]=AC[Q[1]+1]$ or $A[3,0]=D[3]=G$ $A[R[2,0],R[2,0]+2]=AC[Q[2]+0]$ or $A[0,2]=D[4]=B$ $A[R[2,1],R[2,1]+2]=AC[Q[2]+1]$ or $A[1,3]=D[5]=D$ $A[R[3,0],R[3,0]+3]=AC[Q[3]+0]$ or $A[1,0]=D[6]=C$ $A[R[3,1],R[3,1]+3]=AC[Q[3]+1]$ or $A[2,1]=D[7]=E$

The coordinates of an element of the original matrix are provided by:

$AT[R[j,i]+j,[j,i]]=D[Q[j]+i]$, wherein $j$=column number $i=0, \ldots, S[j]-1$, and $Q[j]+i=k$.

====Reconstruction of the Transposed Matrix:

$AT[R[0,0]+0,R[0,0]]=AC[Q[0]+0]$ or $A[2,2]=D[0]=F$ $AT[R[0,1]+0,R[0,1]]=AC[Q[0]+1]$ or $A[3,3]=D[1]=H$ $AT[R[1,0]+1,R[1,0]]=AC[Q[1]+0]$ or $A[1,0]=D[2]=A$ $AT[R[1,1]+1,R[1,1]]=AC[Q[1]+1]$ or $A[0,3]=D[3]=G$ $AT[R[2,0]+2,R[2,0]]=AC[Q[2]+0]$ or $A[2,0]=D[4]=B$ $AT[R[2,1]+2,R[2,1]]=AC[Q[2]+1]$ or $A[3,1]=D[5]=D$ $AT[R[3,0], +3 R[3,0]]=AC[Q[3]+0]$ or $A[0,1]=D[6]=C$ $AT[R[3,1]+3,R[3,1]]=AC[Q[3]+1]$ or $A[1, 2]=D[7]=E$

Illustration for 4:8 Sparsity
An implementation of calculations of functions S, Q and R is illustrated for a matrix having 8 rows, 8 columns, and 32 non-zero values. checked ./spmm_by_diagonals
====num_rows 8 num_cols 8 nnz 32
====MakeRandomCsrMatrix: requested nnz: 32 assigend nnz: 32 dims: 8×8
====nnz_mask of created sparse matrix: 3C743C3C5A6C1E56

```
0 1 0 1 0 1 1 0
0 0 0 1 1 1 1 0
0 1 1 0 1 1 0 0
0 1 0 1 1 0 1 0
0 0 1 1 1 1 0 0
0 0 1 1 1 1 0 0
0 1 1 1 0 1 0 0
0 0 1 1 1 1 0 0
```

====nnz_mask after cyclic shift: 1E1D87C3D2B13C56

```
0 1 0 1 0 1 1 0
0 0 1 1 1 1 0 0
1 0 1 1 0 0 0 1
1 1 0 1 0 0 1 0
1 1 0 0 0 0 1 1
1 0 0 0 0 1 1 1
0 0 0 1 1 1 0 1
0 0 0 1 1 1 1 0
```

====column sums of the shifted nnz_mask: 403020603050504
====prefix of column sums 407090F12171C20
Index function format: diagonal number followed by row numbers of non-zero values along this diagonal
0: 2 3 4 5
1: 0 3 4
2: 1 2
3: 0 1 2 3 6 7
4: 1 6 7
5: 0 1 5 6 7
6: 0 3 4 5 7
7: 2 4 5 6
====Testing by rows is done.
The index function format provides that in matrix A:
diagonal 0 has four non-zero elements, located at rows 2, 3, 4, and 5;
diagonal 1 has three non-zeros, located at rows 0, 3, and 4;
diagonal 2 has two non-zeros, located at rows 1 and 2;
diagonal 3 has six non-zeros, located at rows 0, 1, 2, 3, 6, and 7;
diagonal 4 has three non-zeros, located at rows 1, 6, and 7;
diagonal 5 has five non-zeros, located at rows 0, 1, 5, 6, and 7;
diagonal 6 has five non-zeros, located at rows 0, 3, 4, 5, and 7; and
diagonal 6 has four non-zeros, located at rows 2, 4, 5, and 6.
The index function format and array D including non-zero elements may be used to determine the matrix and/or the transposed matrix using equations:

$A[R[j,i],R[j,i]+j]=D[Q[j]+i]$, where $j$=column number, $i=0,\ldots,S[j]-1$, and $Q[j]+i=k$; and $AT[R[j,i]+j,R[j,i]]=D[Q[j]+i]$, wherein $j$=column number $i=0,\ldots,S[j]-1$, and $Q[j]+i=k$.

A Parallel Processing Architecture for Generating Data using the Diagonal Storage Format and/or Extracting Matrix and/or Transposed Matrix from Data Using Diagonal Storage Format More illustrative information will now be set forth regarding various optional architectures and features with which the foregoing framework may be implemented, per the desires of the user. It should be strongly noted that the following information is set forth for illustrative purposes and should not be construed as limiting in any manner Any of the following features may be optionally incorporated with or without the exclusion of other features described.

Figure 13:
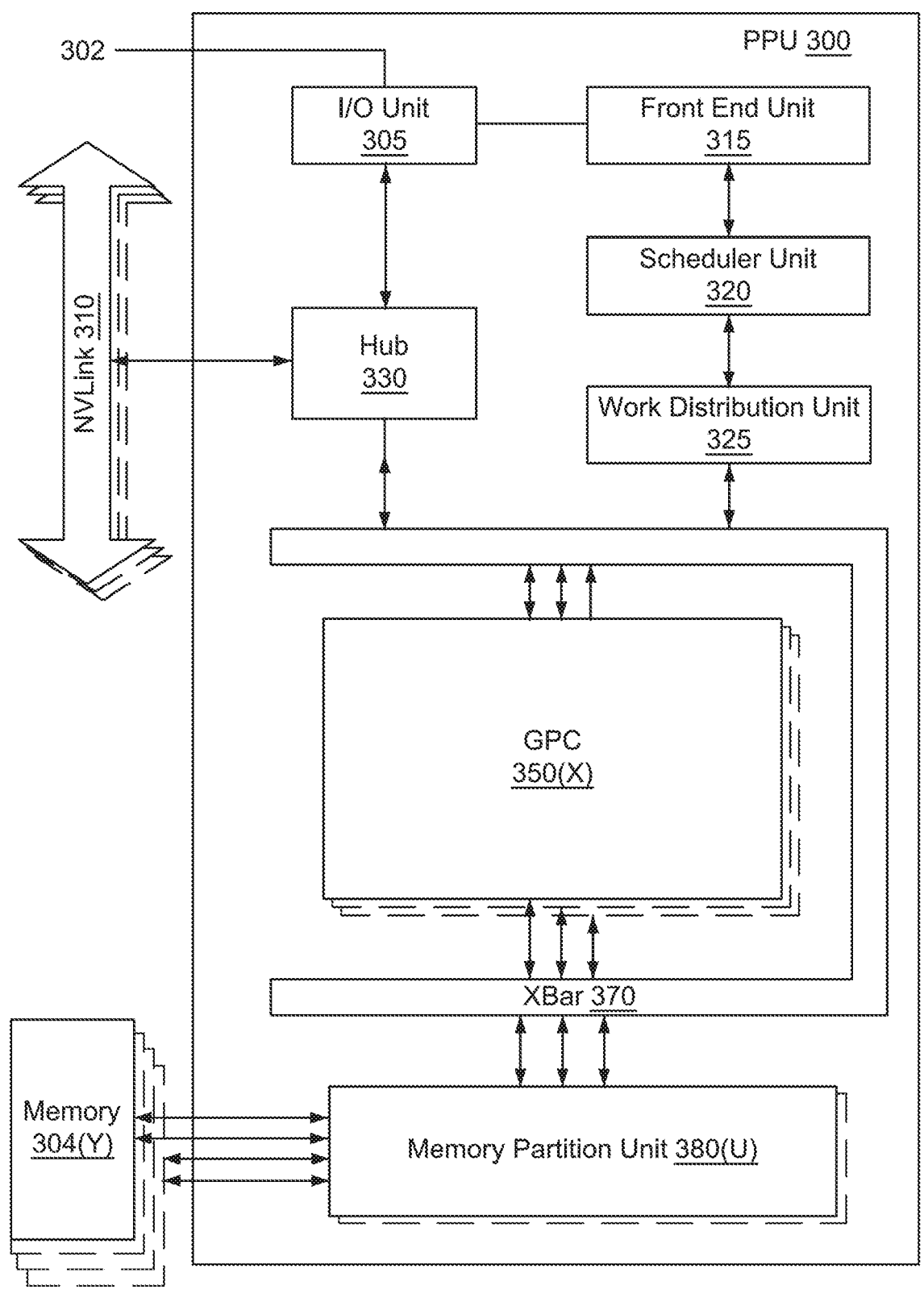
FIG. 13 illustrates a parallel processing unit, in accordance with an embodiment.

FIG. 13 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 13, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 15B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 14B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 14A:
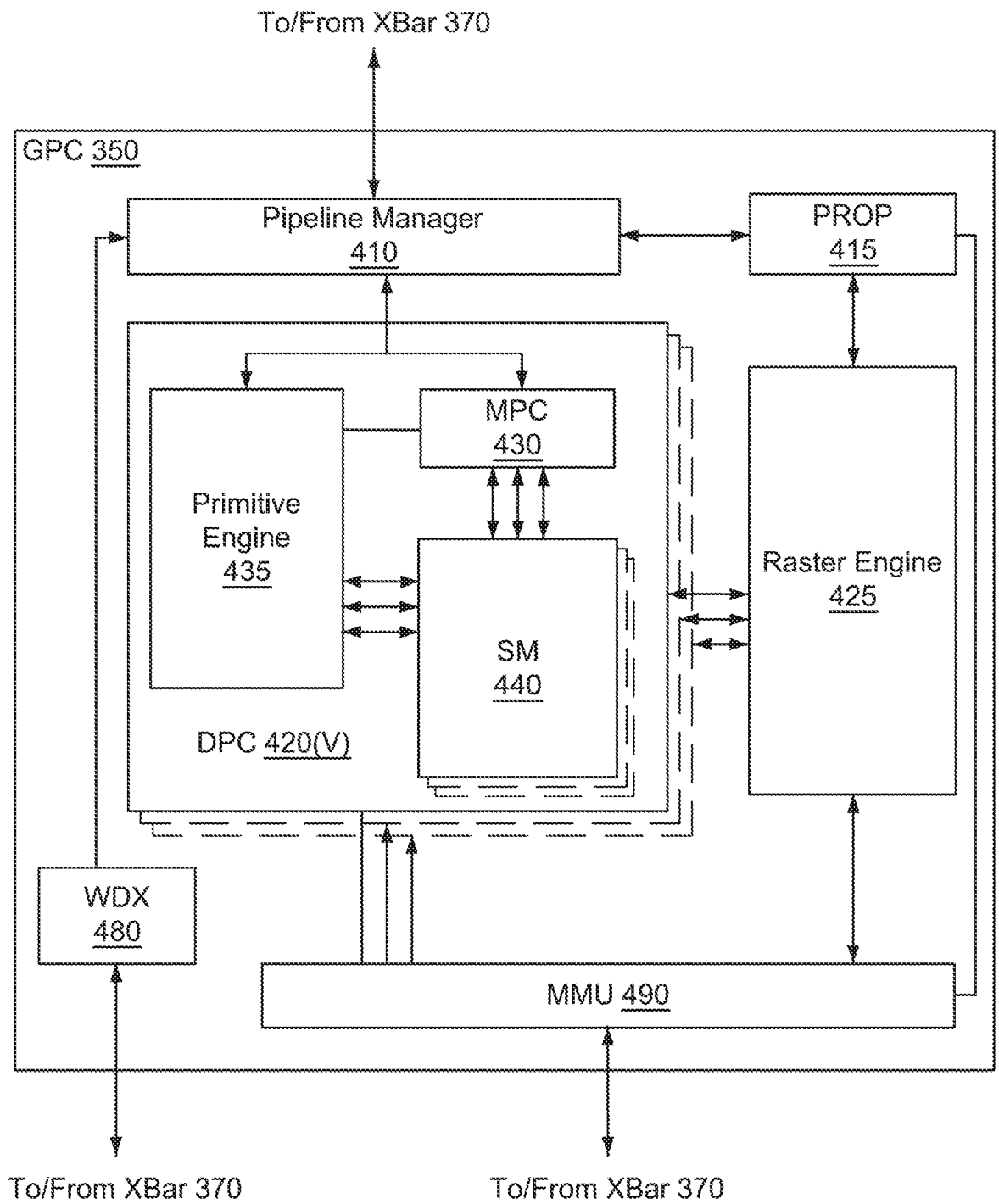
FIG. 14A illustrates a general processing cluster within the parallel processing unit of FIG. 13, in accordance with an embodiment.

FIG. 14A illustrates a GPC 350 of the PPU 300 of FIG. 13, in accordance with an embodiment. As shown in FIG. 14A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 14A may include other hardware units in lieu of or in addition to the units shown in FIG. 14A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 14B:
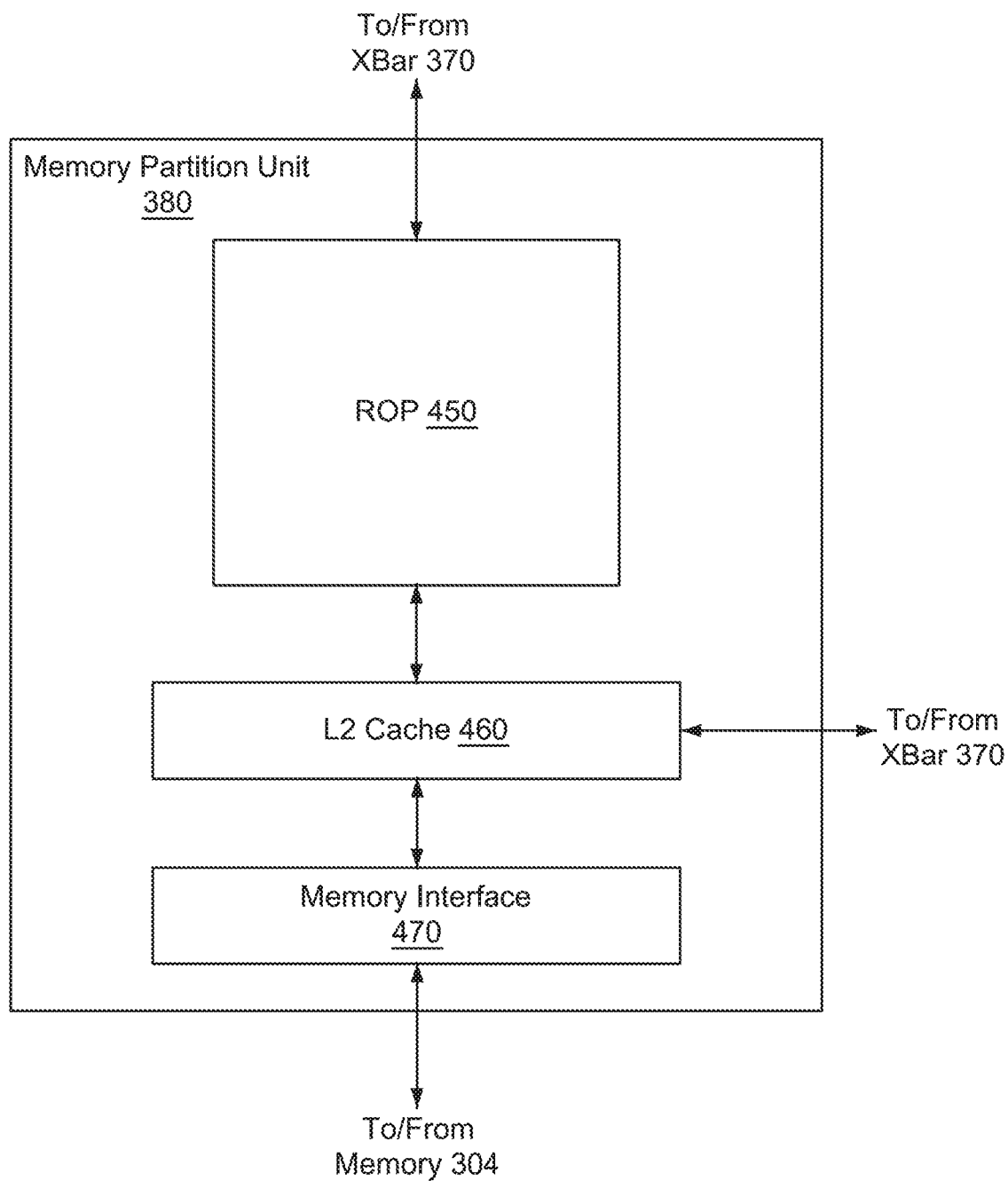
FIG. 14B illustrates a memory partition unit of the parallel processing unit of FIG. 13, in accordance with an embodiment.

The PROP unit 415 is configured to route data generated by the raster engine 425 and the DPCs 420 to a Raster Operations (ROP) unit, described in more detail in conjunction with FIG. 14B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 15A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 14B illustrates a memory partition unit 380 of the PPU 300 of FIG. 13, in accordance with an embodiment. As shown in FIG. 14B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 14B, in other embodiment, the ROP unit 450 may be outside of the memory partition unit 380. For example, the ROP unit 450 may reside in the GPC 350 or another unit.

Figure 15A:
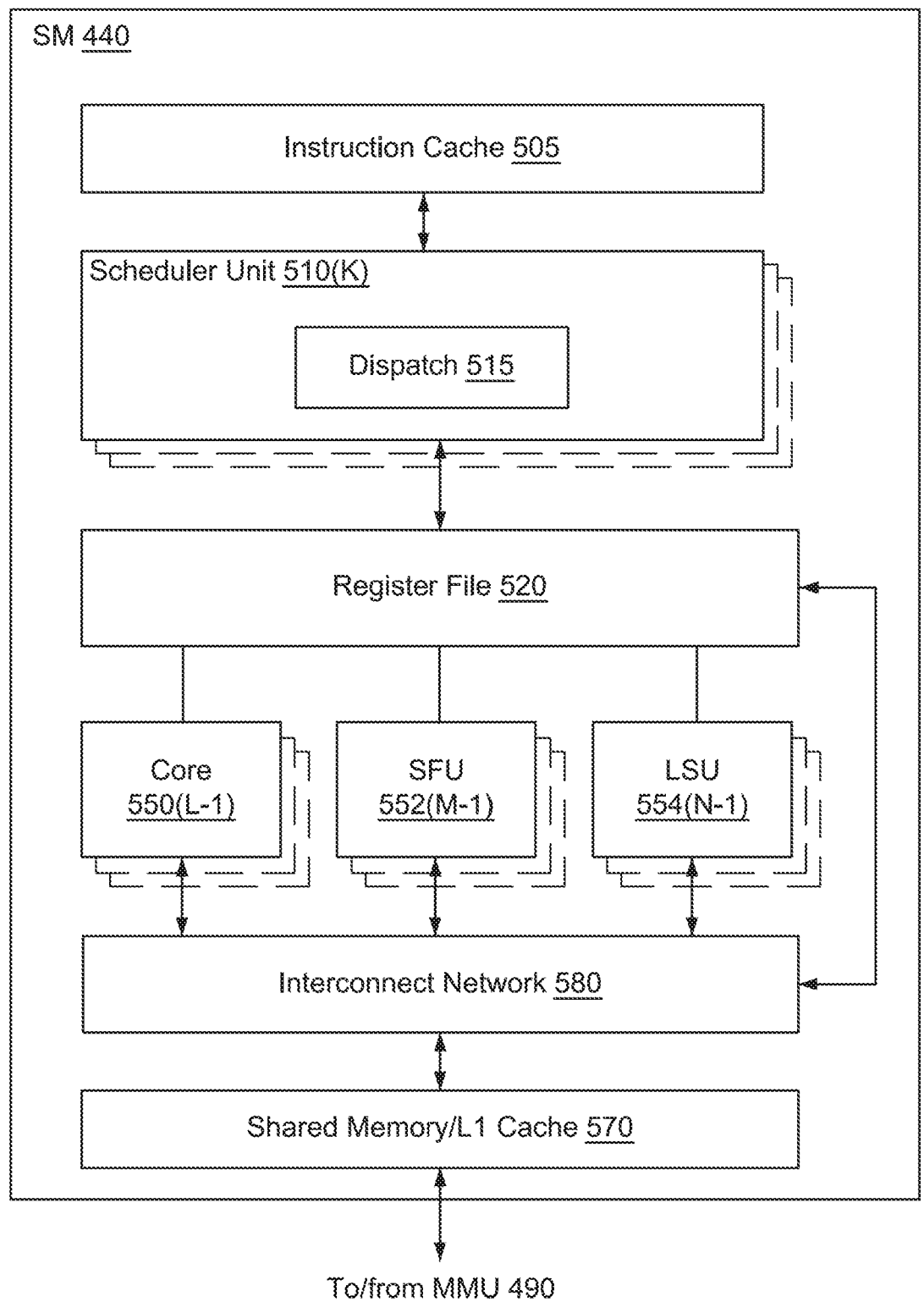
FIG. 15A illustrates the streaming multiprocessor of FIG. 14A, in accordance with an embodiment.

FIG. 15A illustrates the streaming multiprocessor 440 of FIG. 14A, in accordance with an embodiment. As shown in FIG. 15A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

In some embodiments, transposition hardware is included in the processing cores 550 or another functional unit (e.g., SFUs 552 or LSUs 554) and is configured to generate matrix data stored by diagonals and/or generate the original matrix and/or transposed matrix from the matrix data stored by diagonals. The transposition hardware may be provide inside of the shared memory 570 to register file 520 load path of the SM 440.

In one example, the matrix data stored by diagonals may be fetched from DRAM and stored in the shared memory 570. As the instruction to perform processing using the matrix data stored by diagonals is processed, transposition hardware disposed in the path of the shared memory 570 and the register file 520 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 520.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 15B:
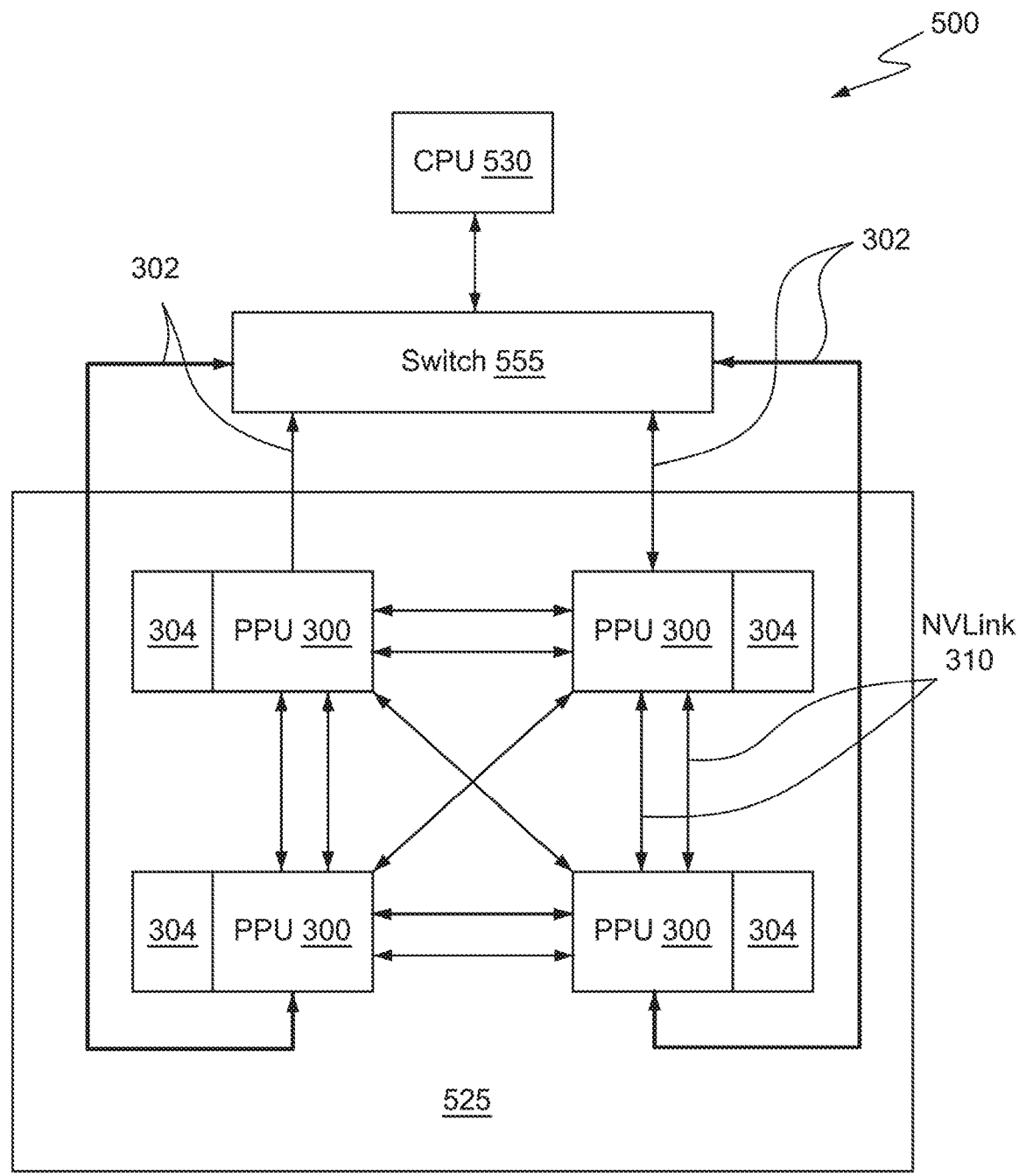
FIG. 15B is a conceptual diagram of a processing system implemented using the parallel processing unit (PPU) of FIG. 13, in accordance with an embodiment.

FIG. 15B is a conceptual diagram of a processing system 500 implemented using the PPU 300 of FIG. 13, in accordance with an embodiment. The exemplary system 500 may be configured to implement the methods disclosed in this application (e.g., methods shown in FIG. 5, 6, or 8). The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 15B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 15B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 15B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 15C:
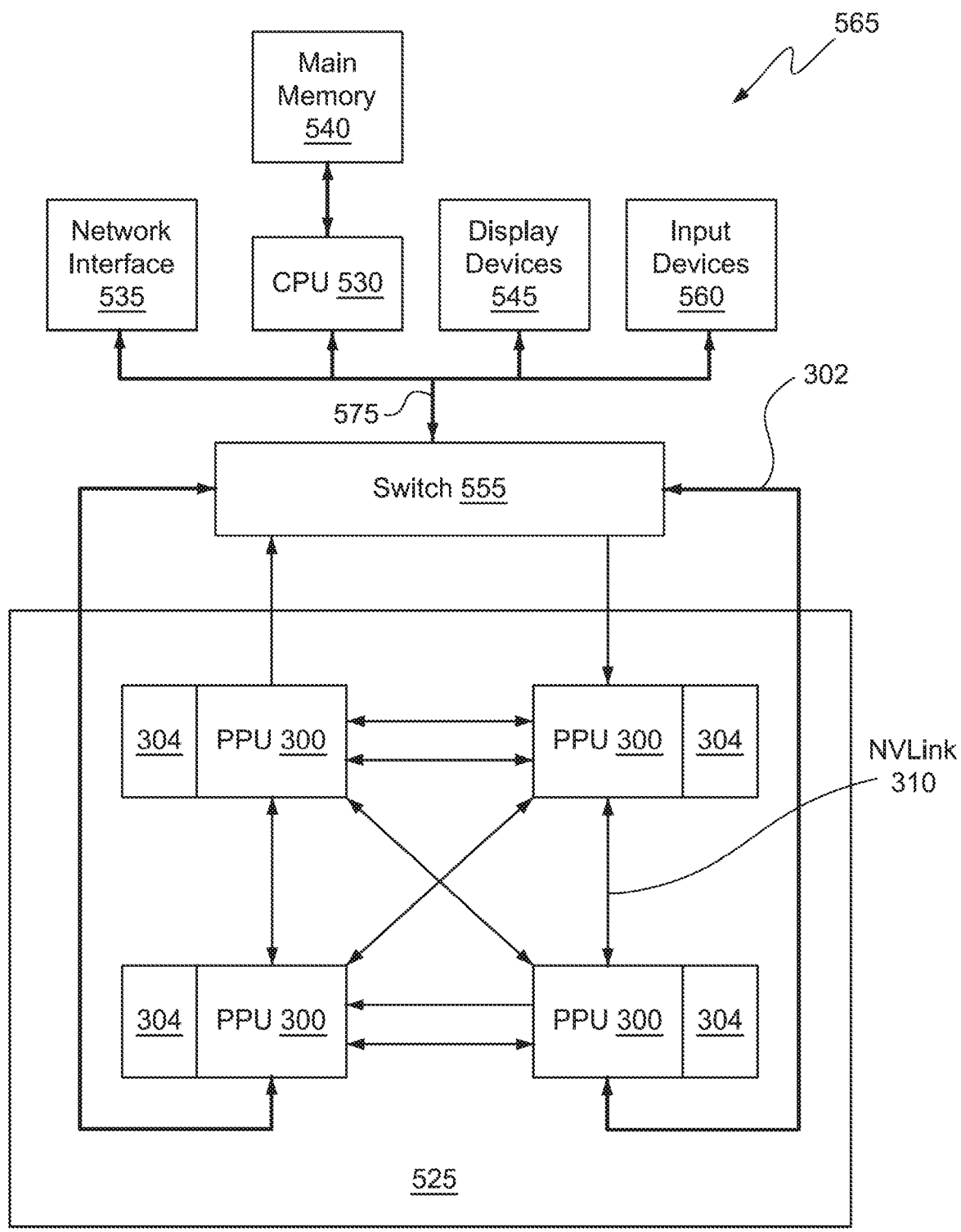
FIG. 15C illustrates an exemplary system in which the various architecture and/or functionality of the various previous embodiments may be implemented.

FIG. 15C illustrates an exemplary system 565 in which the various architecture and/or functionality of the various previous embodiments may be implemented. The exemplary system 565 may be configured to implement the methods disclosed in this application (e.g., methods shown in FIG. 5, 6, or 8).

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 16:
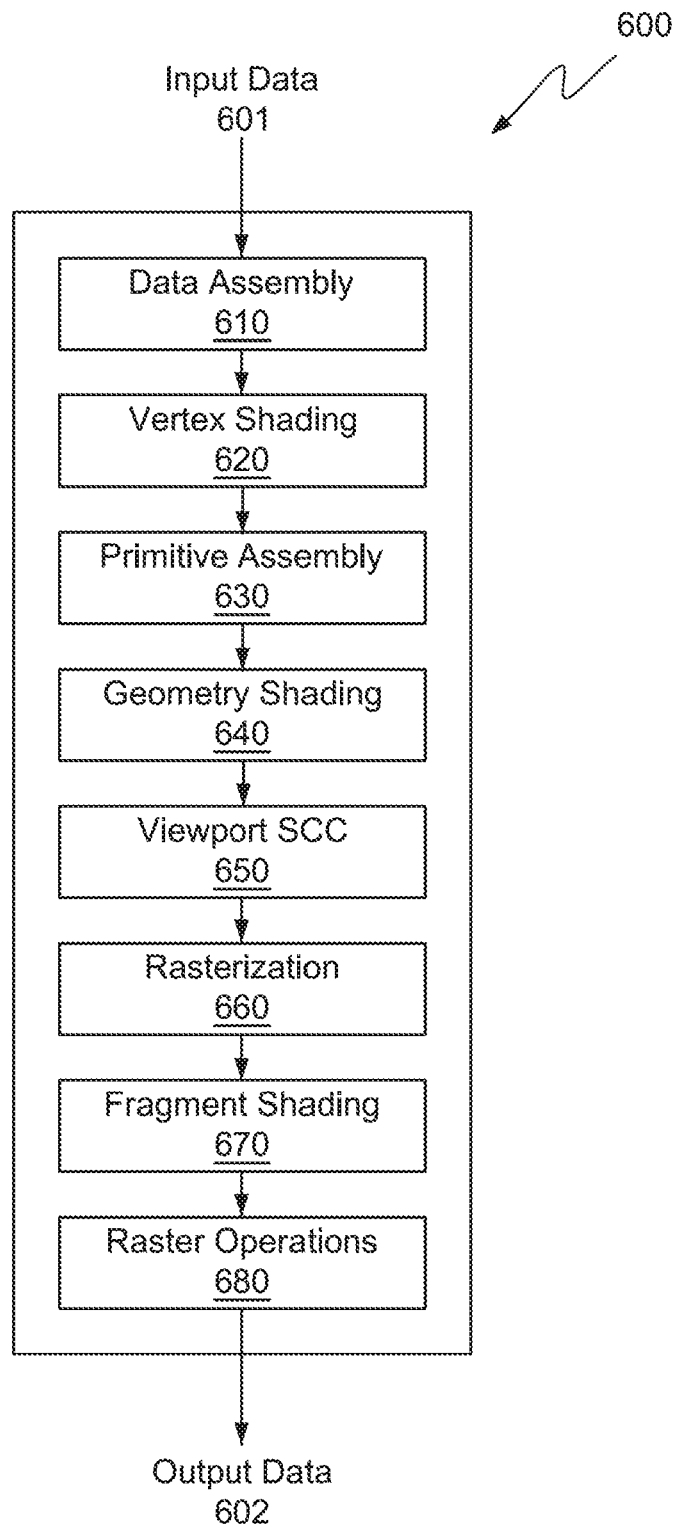
FIG. 16 is a conceptual diagram of a graphics processing pipeline implemented by the PPU of FIG. 13, in accordance with an embodiment.

FIG. 16 is a conceptual diagram of a graphics processing pipeline 600 implemented by the PPU 300 of FIG. 13, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Example Technical Advantages of Some Embodiments

Certain example embodiments provide for improved generation of original matrix and/or transposed matrices from compressed matrix data.

Compared with conventional approaches to storing matrices and generating transposed matrices, example embodiments of methods and systems use less storage, improve transmission time, and/or reduce computation time. Unlike conventional approaches, it is not required to store and/or transfer both the original matrix and the transposed matrix when using the diagonal storage format because the original matrix, transposed matrix, compacted original matrix, and/or compacted transposed matrix can be easily generated from the diagonal storage format. In addition, the benefits of diagonal storage format are applicable to large matrices.

Numerous modifications and variations of the present invention are possible in light of the above teachings. It is therefore to be understood that within the scope of the appended claims, the invention may be practiced otherwise than as specifically described herein.

The invention claimed is:

1. A data decompressor system comprising:
an input circuit configured to receive a compressed data file comprising (a) a stream of non-zero values along sparse matrix diagonals and (b) a mask indicating sparse matrix locations of the non-zero values; and
a decoder configured to use the mask to populate a transposed dense matrix with the non-zero values in the stream, wherein the decoder is configured to populate the transposed dense matrix from the compressed data without writing intermediate results matrix data back to memory.

2. The data decompressor system of claim 1, wherein the sparse matrix has a sparsity greater than 0.5.

3. The data decompressor system of claim 1, wherein intermediate results matrix data includes an untransposed sparse matrix and/or an untransposed dense matrix.

4. The data decompressor system of claim 1, wherein the decoder is configured to selectively populate an untransposed matrix, an untransposed dense matrix, a transposed sparse matrix, or the transposed dense matrix with the non-zero values in the stream based on the mask.

5. The data decompressor system of claim 1, wherein the mask includes a bitmask indicating location of each non-zero value in the sparse matrix and the decoder is further configured to:
cyclically shift i-th row of the bitmask left by i bits;
determine rows in each column of the cyclically shifted bitmask having non-zero values; and
for each non-zero value, determine transposed dense matrix coordinates for the non-zero value based on the rows and columns in the cyclically shifted bitmask indicating non-zero values.

6. The data decompressor system of claim 1, wherein the mask includes a bitmask indicating location of each non-zero value in the sparse matrix and the decoder is further configured to:
cyclically shift i-th row of the bitmask left by i bits;
determine an array S including sum columns of cyclically shifted bitmask;
determine an array including prefix sum of array S;
for each column j of cyclically shifted bitmask, generate a vector of length S(j) indicating rows with non-zero values in column j; and
for each non-zero value, determine transposed matrix coordinates based on the rows with non-zero values and the array including prefix sum of array S.

7. The data decompressor system of claim 1, wherein the compressed data file comprises neural network data.

8. A processing system configured to execute load matrix instructions stored in memory to:
retrieve compressed data comprising (a) a stream of non-zero values along matrix diagonals and (b) a mask indicating matrix locations of the non-zero values in the stream; and
generate, based on the stream of non-zero values and the mask, a dense matrix and metadata without writing intermediate results matrix data back to the memory, the dense matrix including the non-zero values in the stream and zeros.

9. The processing system of claim 8, wherein the generated dense matrix is a transposed matrix of a matrix represented by the stream of non-zero values and metadata.

10. The processing system of claim 8, wherein the generated dense matrix is stored in registers.

11. The processing system of claim 8, wherein a matrix represented by the stream of non-zero values and the mask includes data with sparsity greater than 0.5.

12. A method performed by at least one programmable processor, the method comprising:
receiving, from memory, compressed matrix data comprising an array of consecutive non-zero values along diagonals of a matrix and a mask indicating locations of non-zero values;
generating a dense matrix and/or a dense transposed matrix based on the array of consecutive non-zero values and the mask without writing intermediate results matrix data back to the memory, wherein the dense matrix and/or the dense transposed matrix includes the non-zero values in the array and zeros; and
storing the generated dense matrix or dense transposed matrix in the memory.

13. The method of claim 12, wherein the dense transposed matrix is generated and the method further comprises performing a matrix multiply operation using the generated transposed matrix.

14. The method of claim 12, wherein the mask includes a bitmask and generating the transposed matrix comprises:
cyclically shifting i-th row of the bitmask left by i bits;
determining rows in each column of the cyclically shifted bitmask having non-zero values; and
for each non-zero value, generating matrix and/or transposed matrix coordinates for the non-zero value based on the rows and columns in the cyclically shifted bitmask indicating non-zero values.

15. The method of claim 14, wherein the programmable processor is a multi-threaded processor and the matrix and/or transposed matrix coordinates of the non-zero values are determined by a plurality of threads in a warp, and each thread determines coordinates for a different non-zero value.

16. A method performed by a least one processor executing instructions stored in memory, the method comprising:
receiving, from memory, compressed matrix data including (a) a stream of non-zero values along matrix diagonals and (b) a mask indicating matrix locations of the non-zero values in the stream; and
executing a plurality of threads to determine, based on values of the mask, matrix and/or transposed matrix coordinates of the non-zero values and store the non-zero values and the matrix and/or transposed matrix coordinates in registers associated with the plurality of threads without writing intermediate results matrix data in the registers, wherein each thread of the plurality of threads determines coordinates of a different non-zero value.

17. The method of claim 16, wherein the mask comprises a bitmask indicating location of non-zero values in the matrix, and each thread is executed to:
cyclically shift i-th row of the bitmask left by i places;
determine columns and rows in each column of the cyclically shifted bitmask indicating location of non-zero values; and
generate the matrix and/or transposed matrix coordinates based on the determined rows and columns.

18. The method of claim 16, wherein the transposed matrix coordinates are determined, and the method further comprises performing a matrix multiplication operation using the determined transposed matrix coordinates.

19. The method of claim 16, wherein the matrix is a sparse matrix and the method further comprises: generating, based on the determined matrix and/or transposed matrix coordinates, a dense matrix and/or a dense transposed matrix.

20. A system comprising:
an input circuit configured to receive a compressed data file comprising (a) a stream of non-zero values along sparse matrix diagonals and (b) a mask including a plurality of rows indicating sparse matrix locations of the non-zero values; and
a decoder configured to cyclically shift a plurality of rows of the mask based on the row number of the corresponding row, determine rows in each column of the cyclically shifted mask having non-zero values, and populate a transposed dense matrix with the non-zero values in the stream and zeros based on the stream of non-zero values and rows and columns in the cyclically shifted mask indicating non-zero values without writing intermediate results matrix data back to memory.

* * * * *